(12) United States Patent
Sarkar et al.

(10) Patent No.: US 10,235,559 B2
(45) Date of Patent: Mar. 19, 2019

(54) DOT DETECTION, COLOR CLASSIFICATION OF DOTS AND COUNTING OF COLOR CLASSIFIED DOTS

(71) Applicant: Ventana Medical Systems, Inc., Tucson, AZ (US)

(72) Inventors: Anindya Sarkar, Milpitas, CA (US); Jim Martin, Mountain View, CA (US)

(73) Assignee: Ventana Medical Systems, Inc., Tucson, AZ (US)

(*) Notice: Subject to any disclaimer, the term of this patent is extended or adjusted under 35 U.S.C. 154(b) by 1 day.

(21) Appl. No.: 15/659,481

(22) Filed: Jul. 25, 2017

(65) Prior Publication Data

US 2017/0323148 A1     Nov. 9, 2017

Related U.S. Application Data

(63) Continuation of application No. PCT/EP2016/051902, filed on Jan. 29, 2016.
(Continued)

(51) Int. Cl.
    *G06K 9/00*       (2006.01)
    *G06T 7/00*       (2017.01)
(Continued)

(52) U.S. Cl.
CPC ........ *G06K 9/00127* (2013.01); *G06T 7/0012* (2013.01); *G06T 7/11* (2017.01);
(Continued)

(58) Field of Classification Search
CPC .... G06K 9/00127; G06K 9/0014; G06T 7/90; G06T 7/11; G06T 7/0012; G06T 7/136;
(Continued)

(56) References Cited

U.S. PATENT DOCUMENTS

| | | |
|---|---|---|
| 5,650,327 A | 7/1997 | Copeland et al. |
| 5,654,200 A | 8/1997 | Copeland et al. |
| (Continued) | | |

FOREIGN PATENT DOCUMENTS

| | | |
|---|---|---|
| WO | 2011049608 A2 | 4/2011 |
| WO | 2013113707 A1 | 8/2013 |
| (Continued) | | |

OTHER PUBLICATIONS

Palmari J et al: "Distribution of estrogen receptor heterogeneity in growing MCF-7 cells measured by quantitative microscopy", Cytometry, Alan Liss, New York, US, vol. 27, No. 1, Jan. 1, 1997 (Jan. 1, 1997), pp. 26-35, XP003024169, ISSN: 0196-4763.
(Continued)

*Primary Examiner* — Carol Wang
(74) *Attorney, Agent, or Firm* — Charney IP Law LLC; Thomas Finetti

(57) ABSTRACT

The present disclosures relates to a method of detecting, classifying, and counting dots in an image of a tissue specimen comprising detecting dots in an image of the tissue sample that meet criteria for absorbance strength, black unmixed image channel strength, red unmixed image channel strength, and a difference of Gaussian threshold, wherein the detected dots correspond to in situ hybridization signals in the tissue samples; classifying the detected dots as belonging to a black in situ hybridization signal or to a red in situ hybridization signal; and calculating a ratio of those dots belonging to the black in situ hybridization signal and those belonging to the red in situ hybridization signal.

22 Claims, 8 Drawing Sheets
(1 of 8 Drawing Sheet(s) Filed in Color)

Related U.S. Application Data

(60) Provisional application No. 62/109,459, filed on Jan. 29, 2015.

(51) Int. Cl.
  *G06T 7/11*      (2017.01)
  *G06T 7/90*      (2017.01)

(52) U.S. Cl.
  CPC ...... *G06T 7/90* (2017.01); *G06T 2207/10024* (2013.01); *G06T 2207/10056* (2013.01); *G06T 2207/30024* (2013.01); *G06T 2207/30096* (2013.01)

(58) Field of Classification Search
  CPC . G06T 2207/10056; G06T 2207/30096; G06T 2207/10024; G06T 2207/30024; G06F 19/20
  See application file for complete search history.

(56) References Cited

U.S. PATENT DOCUMENTS

| | | | |
|---|---|---|---|
| 6,296,809 | B1 | 10/2001 | Richards et al. |
| 6,352,861 | B1 | 3/2002 | Copeland et al. |
| 6,827,901 | B2 | 12/2004 | Copeland et al. |
| 6,943,029 | B2 | 9/2005 | Copeland et al. |
| 2003/0211630 | A1 | 11/2003 | Richards et al. |
| 2004/0052685 | A1 | 3/2004 | Richards et al. |
| 2008/0299555 | A1 | 12/2008 | Nitta et al. |
| 2010/0254589 | A1* | 10/2010 | Gallagher ............ G06K 9/0014 382/133 |
| 2011/0136130 | A1 | 6/2011 | Gniewek et al. |
| 2014/0178169 | A1 | 6/2014 | Hebert et al. |
| 2014/0267672 | A1* | 9/2014 | Morrison ........... G01N 21/6458 348/79 |
| 2014/0377753 | A1* | 12/2014 | Bamford .............. G06T 7/0012 435/6.11 |
| 2016/0370565 | A1* | 12/2016 | Bredno ............... G02B 21/244 |

FOREIGN PATENT DOCUMENTS

| | | |
|---|---|---|
| WO | 2014195193 A1 | 12/2014 |
| WO | 2015124772 A1 | 8/2015 |

OTHER PUBLICATIONS

Ruifrok A C et al: "Quantification of Histochemical Staining by Color Deconvolution", Analytical and Quantitative Cytology and Histology, St. Louis, MO, US, vol. 23, No. 4, Aug. 1, 2001 (Aug. 1, 2001), pp. 291-299, XP009031319, ISSN: 0884-6812.

Zimmermann: "Spectral Imaging and Linear Unmixing in Light Microscopy", Adv Biochem Engin/Biotechnol, vol. 95, 2005, pp. 245-265.

International Search Report and Written Opinion, dated Apr. 28, 2016.

* cited by examiner

DOT DETECTION, COLOR CLASSIFICATION OF DOTS AND COUNTING OF COLOR CLASSIFIED DOTS

CROSS-REFERENCE TO RELATED APPLICATIONS

This patent application is a continuation of International Patent Application No. PCT/EP2016/051902 filed Jan. 29, 2016, which claims priority to and the benefit of U.S. Provisional Application No. 62/109,459, filed Jan. 29, 2015. Each of the above patent applications are hereby incorporated by reference herein in their entireties.

BACKGROUND OF THE DISCLOSURE

Molecular pathology is the examination at a molecular level of the DNA, mRNA, and proteins that cause or are otherwise associated with disease. Gene amplification and/or overexpression have been identified as an indicator of patient prognosis in a variety of tumors or for determining those patients that should be provided certain treatments. For example, a certain type of breast cancer is associated with an over-abundance (e.g., over expression) of the human epidermal growth factor 2 ("HER2") versus the number of chromosome 17s found in the cell. Sadly, this alteration is also an independent prognostic factor predictive of poor clinical outcome and a high risk of recurrence. By detecting the number of HER2 genes versus the number of chromosome 17s in a tissue sample, this particular type of breast cancer can be more readily identified and treatment options can be evaluated.

In-situ hybridization can be used to look for the presence of a genetic abnormality or condition such as amplification of cancer causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample. For example, INFORM HER2 Dual ISH DNA Probe Cocktail Assay from Ventana Medical Systems, Inc., is intended to determine HER2 gene status by enumeration of the ratio of the HER2 gene to Chromosome 17. The HER2 and Chromosome 17 probes are detected using a two color chromogenic ISH in formalin-fixed, paraffin-embedded human breast cancer tissue specimens.

Digital microscopy systems have been introduced wherein tissue samples are prepared in the usual way of being mounted on glass slides, but instead of having the pathologist view the samples using a manually controlled optical microscope, the slides are processed using digital imaging equipment. In recent years, digital pathology has transformed from the use of camera-equipped microscopes to high-throughput digital scanning of whole tissue samples. This development not only enables virtual storing and sharing of biological data, but it also improves the turn-around times for the pathologist and the patient.

The digitization of biological data has enabled the use of computers assisting in the diagnosis. The dramatic increase of computer power over the past decades, together with the development of advanced image analysis algorithms, has allowed the development of computer-assisted approaches capable of analyzing the bio-medical data. Interpreting tissue slides manually is labor intensive, costly and involves the risk of human errors and inconsistency, while using automated image analysis can provide additional automatic, fast and reproducible analyses, assisting the pathologist in making an accurate and timely diagnosis.

Digital images for automated analysis often contain variations that make it difficult to detect and classify differently colored dots representative of, for example, ISH signals. For example, and in the context of dual ISH for HER2 gene expression determination, black dots and red dots may not be as distinguishable as one would like. Other problems may exist including (a) image backgrounds stained with the same or similar color to the signals being detected, (b) optical fringing (chromatic aberrations) of objects within the image, and (c) poor focus of the original image. In addition, it is possible that any dot detection and classification method may (i) incorrectly classify objects whose features are faint (e.g. a faint red dot may get detected but may not be classified properly as a red dot versus a black dot), (ii) fail to detect those dots that are faint; or (iii) in instances where the image contains speckling of small black dots, the speckling may be wrongly picked up and/or classified as black dots.

Thus, there remains a need for an improved method of detecting and classifying dot pixels within cell nuclei that provides a high level of quality and accuracy, while deciphering the multitude of variations aberrations and other "defects" that exist in images.

BRIEF SUMMARY OF THE DISCLOSURE

In one aspect of the present disclosure is a computing device configured to detect an expression level of a gene in a tissue sample comprising one or more processors and at least one memory, the at least one memory storing non-transitory computer-readable instructions for execution by the one or more processors to cause the one or more processors to execute instructions to: detect dots in an image of the tissue sample that meet criteria for absorbance strength, black unmixed image channel strength, red unmixed image channel strength, and a difference of Gaussian threshold, wherein the detected dots correspond to in situ hybridization signals in the tissue samples; classify the detected dots as belonging to a black in situ hybridization signal corresponding to HER2 or to a red in situ hybridization signal corresponding to Chromosome 17; and calculate a ratio of those classified dots belonging to the black in situ hybridization signal and those belonging to the red in situ hybridization signal. In some embodiments, the dots that meet the criteria for absorbance strength, black unmixed image channel strength, red unmixed image channel strength, and the difference of Gaussian threshold are detected by computing a union of dot pixels and black/red pixels meeting predefined threshold criteria.

In some embodiments, the dot pixels are determined by identifying pixels in the image of the tissue sample that meet both absorbance thresholds and DoG thresholds. In some embodiments, the pixels that meet the absorbance threshold are identified by deriving an absorbance image from the image of the tissue sample and evaluating whether pixels in the absorbance image meet the absorbance threshold; and wherein the pixels that meet the DoG threshold are identified by deriving a DoG image from the image of the tissue sample and evaluating whether pixels in the DoG image meet the DoG threshold.

In some embodiments, the black/red pixels are determined by independently identifying (i) prospective black pixels meeting absorbance thresholds, and (ii) prospective red pixels meeting absorbance thresholds. In some embodiments, the prospective black pixels are determined by identifying black pixels in the image of the tissue sample that meet both a black unmixed channel image threshold and a DoG threshold. In some embodiments, the black pixels that meet the black unmixed image channel image threshold are identified by deriving a black unmixed channel image from the image of the tissue sample and evaluating whether pixels in the black unmixed channel image meet the black unmixed channel image threshold; and wherein black pixels that meet the DoG threshold are identified by deriving a DoG image from the image of the tissue sample and evaluating whether black pixels in the DoG image meet the DoG threshold.

In some embodiments, the prospective red pixels are determined by identifying red pixels in the image of the tissue sample that meet both a red unmixed channel image threshold and a DoG threshold. In some embodiments, the red pixels that meet the red unmixed image channel image threshold are identified by deriving a red unmixed channel image from the image of the tissue sample and evaluating whether pixels in the red unmixed channel image meet the red unmixed channel image threshold; and wherein red pixels that meet the DoG threshold are identified by deriving a DoG image from the image of the tissue sample and evaluating whether red pixels in the DoG image meet the DoG threshold. In some embodiments, the detection of the dots further comprises providing instructions to perform morphological operations on a prospective set of dot pixels.

In some embodiments, instructions are provided to refine the dot detection and classification. In some embodiments, the dot detection and classification is refined by providing instructions to remove blue dots wrongly classified as black by performing a 2-class k means clustering based on absorbance and radial symmetry vote strength. In some embodiments, the dot detection and classification is refined by providing instructions to discard fringing red dot blobs and fringing black dot blobs by applying shape based heuristics to the image of the tissue sample. In some embodiments, the dot detection and classification is refined by restoring missed black and red dots by providing instructions (1) to identify local maxima using radial symmetry voting on a gradient magnitude image computed on an absorbance image to identify black dots centers; and (2) identify local maxima using radial symmetry voting on a gradient magnitude image computed on an A channel image in the LAB domain to identify red dot centers.

In some embodiments, the ratio is calculated based on a count of red dot blobs and black dot blobs, wherein the red dot blobs are identified by connected components labeling of all classified dots belonging to the red in situ hybridization signal and wherein the black dot blobs are identified by connected components labeling of all classified dots belonging to the black in situ hybridization signal. In some embodiments, instructions are provided to determine an expression level of a gene by evaluating the calculated ratio.

In another aspect of the present disclosure is a computer-implemented method of detecting, classifying, and counting dots in an image of a tissue specimen comprising detecting dots in an image of the tissue sample that meet criteria for absorbance strength, black unmixed image channel strength, red unmixed image channel strength, and a difference of Gaussian threshold, wherein the detected dots correspond to in situ hybridization signals in the tissue samples; classifying the detected dots as belonging to a black in situ hybridization signal or to a red in situ hybridization signal; and calculating a ratio of those classified dots belonging to the black in situ hybridization signal and those belonging to the red in situ hybridization signal. In some embodiments, the dots that meet criteria for the absorbance strength, the black unmixed image channel strength, the red unmixed image channel strength, and the difference of Gaussian threshold are detected by computing a union of dot pixels black/red pixels meeting predefined threshold criteria.

In some embodiments, the dot pixels are determined by identifying pixels in the image of the tissue sample that meet both absorbance thresholds and DoG thresholds. In some embodiments, the pixels that meet the absorbance threshold are identified by deriving an absorbance image from the image of the tissue sample and evaluating whether pixels in the absorbance image meet the absorbance threshold; and wherein the pixels that meet the DoG threshold are identified by deriving a DoG image from the image of the tissue sample and evaluating whether pixels in the DoG image meet the DoG threshold.

In some embodiments, the black/red pixels are determined by independently identifying (i) prospective black pixels meeting absorbance thresholds, and (ii) prospective red pixels meeting absorbance thresholds. In some embodiments, the prospective black pixels are determined by identifying black pixels in the image of the tissue sample that meet both a black unmixed channel image threshold and a DoG threshold. In some embodiments, the black pixels that meet the black unmixed image channel image threshold are identified by deriving a black unmixed channel image from the image of the tissue sample and evaluating whether pixels in the black unmixed channel image meet the black unmixed channel image threshold; and wherein black pixels that meet the DoG threshold are identified by deriving a DoG image from the image of the tissue sample and evaluating whether black pixels in the DoG image meet the DoG threshold. In some embodiments, the prospective red pixels are determined by identifying red pixels in the image of the tissue sample that meet both a red unmixed channel image threshold and a DoG threshold. In some embodiments, the red pixels that meet the red unmixed image channel image threshold are identified by deriving a red unmixed channel image from the image of the tissue sample and evaluating whether pixels in the red unmixed channel image meet the red unmixed channel image threshold; and wherein red pixels that meet the DoG threshold are identified by deriving a DoG image from the image of the tissue sample and evaluating whether red pixels in the DoG image meet the DoG threshold.

In some embodiments, the detection of dots further comprises performing morphological operations on a prospective set of dot pixels. In some embodiments, the method further comprises refining the dot detection and classification. In some embodiments, the refinement removes blue dots wrongly classified as black by performing a 2-class k means clustering based on absorbance and radial symmetry vote strength. In some embodiments, the refinement discards fringing red dot blobs and fringing black dot blobs by applying shape based heuristics to the image of the tissue sample. In some embodiments, the refinement restores missed black dots and missed red dots by providing instructions (1) to identify local maxima using radial symmetry voting on a gradient magnitude image computed on an absorbance image to identify black dots centers; and (2) identify local maxima using radial symmetry voting on a gradient magnitude image computed on an A channel image in the LAB domain to identify red dot centers.

In some embodiments, the ratio is calculated based on a count of red dot blobs and black dot blobs, wherein the red dot blobs are identified by connected components labeling of all classified dots belonging to the red in situ hybridization signal and wherein the black dot blobs are identified by connected components labeling of all classified dots belonging to the black in situ hybridization signal. In some embodiments, the method further comprises determining an expression level of a gene by evaluating the calculated ratio.

In another aspect of the present disclosure is a method for automated evaluation of a level of gene expression: (a) applying in situ hybridization probes to a tissue specimen, the in situ hybridization probes providing first and second in situ hybridization signals (e.g. black and red signals); (b) subsequently obtaining one or more digital images of the tissue specimen; (c) selecting a field of view in the digital image; (d) within the selected field of view, computing a foreground segmentation mask to identify individual nuclei; (e) identifying those nuclei suitable for scoring; (f) detecting dots in the nuclei that meet criteria for absorbance strength, black unmixed image channel strength, red unmixed image channel strength, and a difference of Gaussian threshold, wherein the detected dots correspond to the first and second in situ hybridization signals; (g) classifying the detected dots as belonging to the black in situ hybridization signals or to the red in situ hybridization signals; and (h) calculating a ratio of those classified dots belonging to the black in situ hybridization signal and those belonging to the red in situ hybridization signal. In some embodiments, the method further comprises determining an expression level of a gene by evaluating the calculated ratio.

As described further in Example 1 herein, the present disclosure discloses a superior method of automated dot detection, dot classification, and dot counting as compared with the prior art, especially in the context of dual ISH for HER2 detection. Indeed, Applicants have shown a significant decrease in the number of false negatives picked up by the current method compared to prior art methods, where both methods were evaluated against the same ground truth data. Overall, the presently disclosed method sets forth a workflow which produces results that are more accurate and more robust than previous approaches, even when images containing significant data variability (e.g. stain quality, focus, fringing, and artifacts) were evaluated. It is further believed that the presently disclosed automated scoring process can reduce the time it takes to diagnose and thus increase laboratory throughput. Additionally, the automated process can provide consistent and reliable scoring to enhance interpretation accuracy.

In a further aspect, the invention relates to an image processing method for detecting first and second dots representing in-situ hybridization signals of different color. The method is implemented in an image analysis system. The first and second dots are contained in a digital image of a tissue sample. The pixel intensity values of the first dots indicates in situ hybridization signals generated by a first stain having a first color. The pixel intensity values of the second dots indicate in situ hybridization signals generated by a second stain having a second color. The detection of the first and second dots in the digital image comprises:

generating a first color channel image and a second color channel image via color deconvolution of the digital image, the first color channel image corresponding to the color spectrum contribution of the first stain and the second color channel image corresponding to the color spectrum contribution of the second stain;

computing at least one DoG image from the digital image by applying a pair of Gaussian filters whose Kernels have a different standard deviation (from each other) to the digital image and by subtracting the two filtered images output by the Gaussian filters from each other, the DoG image being a difference-of-Gaussian image;

computing an absorbance image from the tissue sample image;

detecting sets of adjacent pixels in the digital image whose absorbance values in the absorbance image exceed an absorbance threshold and whose DoG values in the DoG image exceeds an DoG threshold and using the detected sets of adjacent pixels as prospective dots;

identifying the ones of the prospective dots whose intensity values in the first color channel image exceeds a first-color-intensity threshold and using said identified prospective dots as the detected first dots; and identifying the ones of the prospective dots whose intensity values in the second color channel image exceeds a second-color-intensity threshold and using said identified prospective dots as the detected second dots.

BRIEF DESCRIPTION OF THE DRAWING FIGURES

The patent or application file contains at least one drawing executed in color. Copies of this patent or patent application publication with color drawings will be provided to the Office upon request and the payment of the necessary fee.

FIG. 1 shows a computer-based system for analyzing specimens in accordance with embodiments of the disclosed technology;

FIG. 2 provides an example of a dual ISH assay to detect HER2 having SISH signal dots and Red ISH signal dots;

FIG. 3 provides a flowchart setting forth the general steps involved in the presently disclosed computer-implemented method;

FIG. 4 provides a flowchart setting forth the steps of dot detection in some embodiments of the present disclosure.

DETAILED DESCRIPTION

Figure 1:
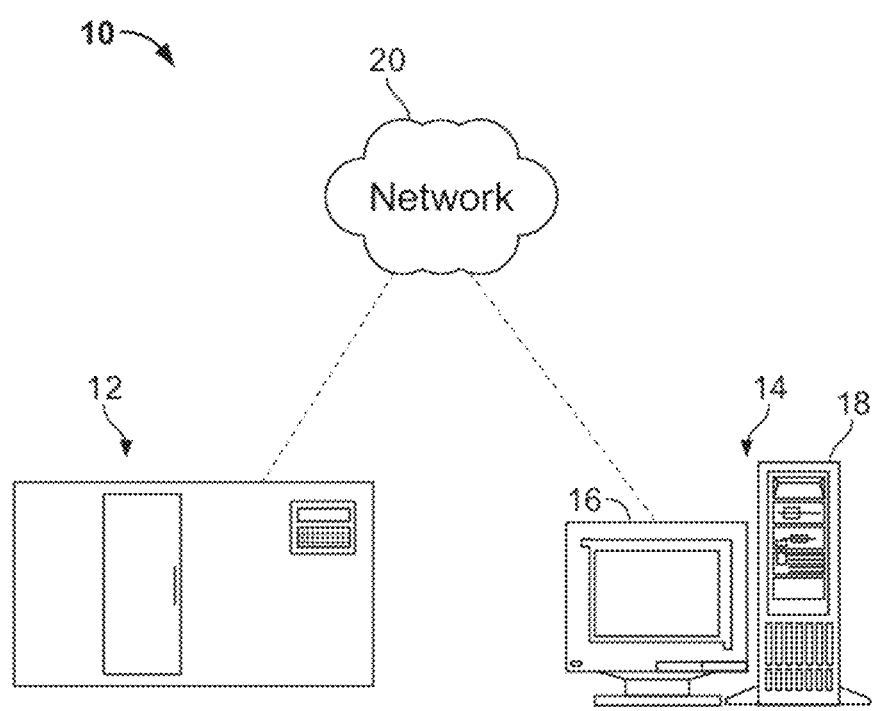

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

A "multi-channel image," "multiplex image," or "multiplexed image" as used herein encompasses a digital image obtained from a biological tissue sample in which different biological structures, are simultaneously stained with specific stains, fluorescent dyes, quantum dots, chromogens, etc. (or any combination thereof), each of which fluoresces or are otherwise detectable in a different spectral band thus constituting one of the channels of the multi-channel image.

A "tissue sample" as used herein is any biological sample that is obtained from a human or animal body for anatomic pathology. For example, a tissue sample may be derived from breast tissue, lung tissue, prostate tissue, etc. and may comprise samples derived from tumors, suspected tumors, or from healthy tissue. Other examples of tissue samples and specimens are their preparation are disclosed herein. The tissue sample may be treated in an assay with one or more stains to assist in the identification of structures (e.g. vessels, cells, etc.) within the sample.

An "unmixed image" as used herein encompasses a grey-value or scalar image obtained for one channel of a multi-channel image. By unmixing a multi-channel image one unmixed image per channel is obtained.

A "blob" or "dot" as used herein is a region of a digital image in which some properties are constant or approximately constant; all the pixels in a blob can be considered in some sense to be similar to each other. Depending on the specific application and in-situ signals to be detected, a "dot" typically comprises 5-60 pixels whereby, for example, a pixel may correspond to about 0.25 microns by 0.25 microns of a tissue slide.

An image analysis system can be, for example, a digital data processing device, e.g. a computer, comprising an interface for receiving image data from a slide scanner, a camera, a network and/or a storage medium.

The present disclosure describes a new method of detecting, classifying, and/or counting dot pixels in a color image of a tissue specimen.

At least some embodiments of the technology disclosed herein relate to computer systems and methods for analyzing digital images captured from tissue samples pretreated with in situ hybridization probes. The samples may be a breast tissue sample processed according to an in situ hybridization ("ISH") protocol, as known in the art. In other embodiments, the specimen is a gastric tissue sample including, but not limited to stomach tissue, esophageal tissue, gastro-esophageal junction tissue, intestinal tissue, and colon tissue, again processed according to an ISH protocol. While specific examples herein may refer to breast tissue, these and other tissues are contemplated.

The ISH protocol provides visualization of specific nucleic acid sequences (e.g., DNA, mRNA, etc.) in frozen tissue sections, fixed/paraffin embedded tissue sections, or other nuclei preparations by hybridizing complementary strands of nucleotides (e.g., probes) to the sequence of interest. The ISH protocol can include, without limitation, a dual SISH and Red ISH protocol, single Red ISH protocol, single SISH protocol, or the like.

Although exemplary embodiments described herein disclose the application of a dual ISH probe for the detection of the expression of the HER2 gene, it will be appreciated that the technology can be used to analyze images of tissue samples treated with other probes and/or assays to detect other genes or portions thereof in cells, as well as other features of interest. For example, while "black dots"," "red dots," "black signals," and "red signals" may be referred to herein in certain examples, it is entirely foreseeable that other probes may be used and analyzed which provide for different signals and/or dots of any color and the filters and evaluations provided herein may be so adapted to accommodate those other assays and probes. Moreover, certain embodiments disclose application of dual ISH scans, taken at 40× resolution, where over-expression or under-expression of a gene depends on the identification of stained dots, where black dots and red dots are expressed through HER2 and Chr-17 markers, respectively.

Figure 2:
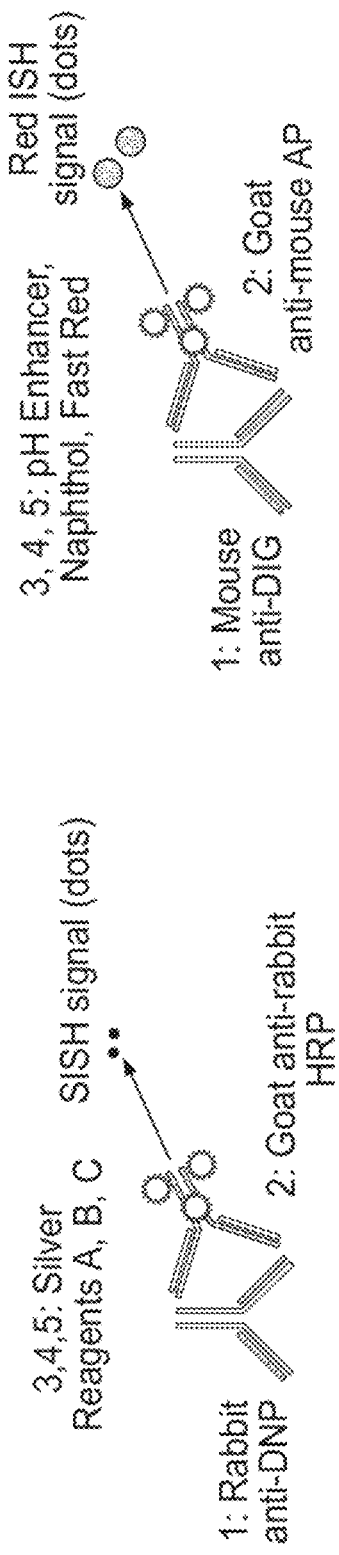
Figure 2:
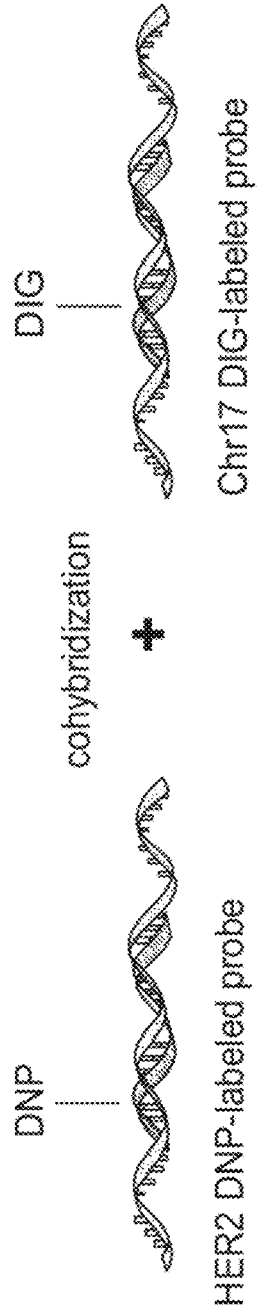
Figure 2:
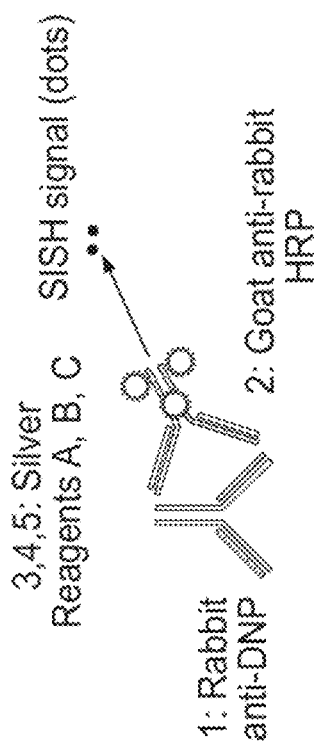

When using the Ventana INFORM HER2 dual ISH assay, to determine a HER2/chromosome 17 ratio, the imaging apparatus 12 captures images that include silver in situ hybridization signals, red in situ hybridization signals, or the like. More specifically, the HER2 gene is detected by a dinitrophenyl (DNP) labeled probe and visualized utilizing VENTANA ultraView Silver ISH DNP (SISH) Detection. The chromosome 17 centromere is targeted with a digoxigenin (DIG) labeled probe and detected using VENTANA ultraView Red ISH DIG Detection. This concept is illustrated further in FIGS. 2A and 2B. Dual ISH staining utilizing this dual detection results in visualization via light microscopy in which HER2 appears as discrete black signals (SISH) (e.g. "SISH signal (dots)" or black dots) and Chr17 as red signals (Red ISH) (e.g. "Red ISH signal (dots)" or red dots). In the context of Dual ISH slides, the cell based scoring involves counting of red and black dots inside the picked cells, where the HER2 gene expression is expressed through black dots and Chromosome-17 is expressed through red dots, as described further herein.

In general, and as described further herein, to automatically score a tissue sample, candidate nuclei are selected for quantitative analysis. The computer system automatically counts different features (e.g., HER2 genes, chromosome 17s, etc.) and determines the ratio of the number of features. Additional nuclei can be scored. A diagnosis can be made based, at least in part, on the ratios determined. To evaluate whether the tissue sample (e.g., breast tissue) is a carcinoma, the computer system can assist the user in obtaining information about the selected region by, for example, detecting the amplification of genes by evaluating the ratio of the number of HER2 gene signals to the number of chromosome 17 signals.

The tissue is scored based on the signals corresponding to HER2 genes and chromosome 17s to determine the HER2/chromosome 17 ratio. Based on the ratio, the specimen's HER2 gene is determined to be amplified (over expressed) or not amplified (under expressed). If the determined score less than 1.8, the HER2 gene is under expressed; if the score is between 1.8 and 2.2, the pathologist will analyze 20 additional cell nuclei (repeatedly, if necessary) until a decisive score less than 1.8 or greater than 2.2 is achieved; and if the score is greater than 2.2, then HER2 gene is over expressed.

A computer-based specimen analyzer for analyzing specimens is shown in FIG. 1. The skilled artisan will appreciate that other computer systems may be utilized and that the computer systems described herein may be communicatively coupled to additional components, e.g. analyzers, scanners, etc. Some of these additional components and the various computers that may be utilized are described further herein.

In general, the imaging apparatus 12 can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of "snapshots." An image can be produced by combining the individual "snapshots." In some embodiments, the imaging apparatus 12 produces a high-resolution image of the entire specimen.

The computer device 14 can include a desktop computer, a laptop computer, a tablet, or the like and can include digital electronic circuitry, firmware, hardware, memory, a computer storage medium, a computer program, a processor (including a programmed processor), or the like. The illustrated computing system 14 of FIG. 1 is a desktop computer with a screen 16 and a tower 18. The tower 18 can store digital images in binary form. The images can also be divided into a matrix of pixels. The pixels can include a digital value of one or more bits, defined by the bit depth. The network 20 or a direct connection interconnects the imaging apparatus 12 and the computer system 14.

Figure 3:
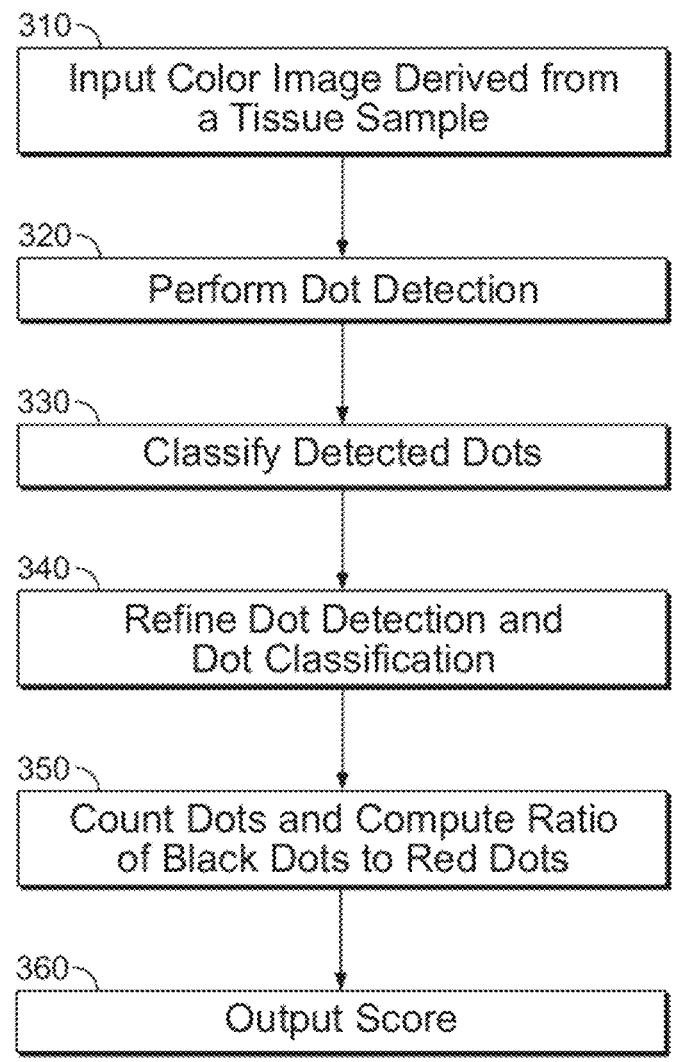
Figure 5:
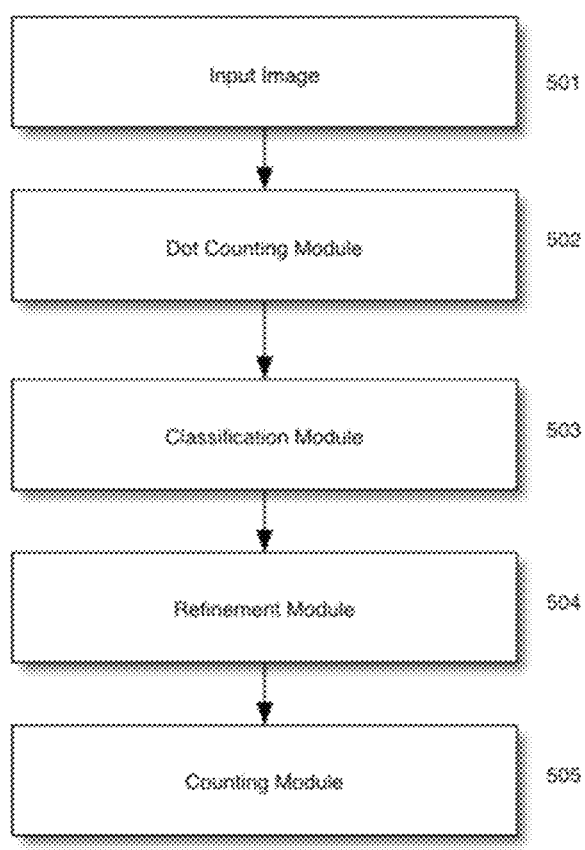
FIG. 5 illustrates the modules comprising the computer system of the present disclosure.

In general, one aspect of the present disclosure is a computer-based device and method for dot detection, classification and counting, the dots corresponding to signals in tissue samples stained in an in situ hybridization assay. The computer systems include one or more processors that are programmed with a series of computer-executable instructions, the instructions being stored in a memory. In general, and with reference to FIGS. 3 and 5, an image is provided as input (step 310, 501), and dots with the image are computed (e.g. by a dot detection module, 502) by evaluating whether features within images derived from the input image meet certain threshold criteria (step 320). After the dots are detected, they are classified (e.g with a classification module, 503) as having a particular color, the colors corresponding to ISH signals within the tissue sample (step 330). Following classification, additional instructions are optionally provided to refine the dot detection and classification (step 350) (e.g. with a refinement module, 504). Following this step, the dots are counted (e.g. with a dot counting module, 505) and a ratio of differently colored dots is computed (step 350). The computed ratio and resulting score is a surrogate for a level of a gene's expression. The score and/or gene expression level classification is output for reporting, such as to a medical professional or patient (step 360). For the HER2 dual ISH assay, the signals are silver signals (also referred to herein as "black signals") and red signals, corresponding to black dots and red dots, respectively, in the input image. Each of these steps is described in more detail herein. Again, while examples are provided in the context of HER2 dual ISH, the dot detection, classification, and refinement methods may be applied to analyze assays having signals and colors different than those exemplified. Those of skill in the art will be able to modify the steps herein to accommodate other assays with different signals (colors).

When executed, instructions cause at least one of the processors of the computer system to receive an input, which may be a color image (e.g. a multiplex image) comprising cell nuclei from a tissue specimen, the tissue specimen having been treated with an assay (for example a HER2 dual ISH assay, having a first ISH signal and a second ISH signal). In some embodiments, the image comprises cell nuclei which have been selected from an upstream segmentation and/or ranking process, such as an automated segmentation and/or ranking process.

Dot Detection

In general, dot detection (see FIG. 3, step 320) is performed with a dot detection module 502 to identify all the dot pixels in an input image. The detected dots are then provided to a classification module for further processing and analysis. Without wishing to be bound by any particular theory, it is believed that dot detection using a combination of various derived image features which include, but are not limited to, absorbance, multi-scale difference of Gaussian (DoG), and features from unmixed image channels obtained obtain after color deconvolution, collectively allows for superior dot detection as compared with prior art methods. For example, prior art methods considered only features present by applying difference of Gaussian on a luminance channel. In contrast, and as shown in Example 1, the present disclosure provides for more accurate and robust dot detection by considering a plurality of features, such as those recited above, where those plurality of features are implemented because they are optimized for the detection of black dots and red dots (for Dual ISH). (See, Ruifrok, Arnout C., and Dennis A. Johnston. "Quantification of histochemical staining by color deconvolution." Analytical and quantitative cytology and histology/the International Academy of Cytology [and] American Society of Cytology 23.4 (2001): 291-299, the disclosure of which is incorporated by reference in its entirety).

Figure 4:
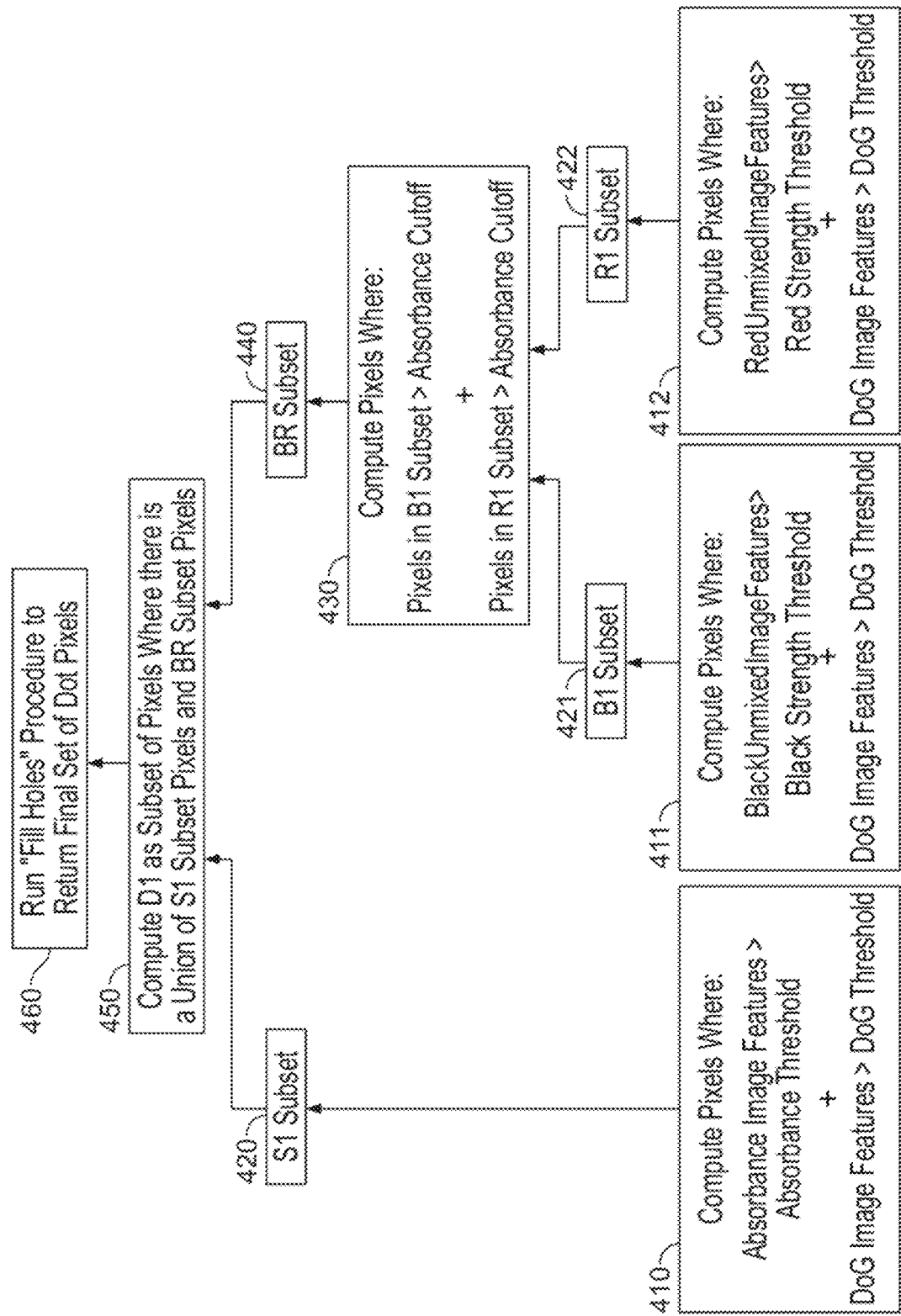

In general, difference of Gaussians is a feature enhancement algorithm that involves the subtraction of one blurred version of an original image from another, less blurred version of the original. In the simple case of grayscale images, the blurred images are obtained by convolving the original grayscale images with Gaussian kernels having differing standard deviations. It is believed that blurring an image using a Gaussian kernel suppresses only high-frequency spatial information. Subtracting one image from the other preserves spatial information that lies between the range of frequencies that are preserved in the two blurred images. Thus, the difference of Gaussians is a band-pass filter that discards all but a handful of spatial frequencies that are present in the original grayscale image The dot detection process, in the context of HER2 dual ISH, is demonstrated in the flowchart of FIG. 4. In some embodiments, dot detection is accomplished by computing pixels based on absorbance image features, difference of Gaussian (DoG) image features, and unmixed color image channel features, where the pixels are computed by evaluating whether certain features within the images meet predefined threshold criteria (see e.g. 410, 411, and 412). In some embodiments, the threshold criteria have been empirically derived after extensive experimentation. In this context, pixels are computed (410, 411, 412) based on features that meet predetermined threshold criteria, e.g. dot pixels that are high enough in both difference of Gaussian (DoG) and absorbance (420); black dot pixels that are high enough in a black unmixed image strength and DoG (421, 440); and red dot pixels that are high enough in red unmixed image strength and DoG (422, 440). In some embodiments, multiple subsets of pixels are computed, each meeting different threshold criteria (420, 421, 422, 440) such that a final subset of pixels are strong in all threshold criteria (450). After the final subset of pixels is computed, a "fill holes" operation is performed (460), as known to those of skill in the art. The skilled artisan will appreciate that different criteria may be established for different ISH probes, assays, and protocols to accommodate different signals (e.g. of different colors) in the images and to optimize dot detection for that specific ISH protocol, accordingly.

In some embodiments, additional images are derived from the image input. For example, based on the input image of the tissue sample, an absorbance image, a multi-scale DoG image, and unmixed color image channel images are derived and used for analysis. Derivation of these images is well known to those of skill in the art. In some embodiments, the computer device or system receives the following as inputs for dot detection (used, e.g., in steps 410, 411, and 412):

(1) Derived images including:

(1a) the 0-th layer in multi scale DoG (DoG0). The multi-scale DoG is implemented by considering Gaussian kernels with progressively decreasing standard variation, and by considering the difference between the images obtained after filtering with two consecutive Gaussians, whereby "blob-like" structures having a certain radii range are expected to be detected. The 0-th layer in the multi-scale DoG corresponds to the image obtained after taking the difference between the image filtered with the coarsest Gaussian (Gaussian with maximum standard deviation) and the image filtered with the next coarsest Gaussian (Gaussian with the next highest standard deviation) (referred to herein as a "difference of Gaussian image" or "DoG image");

For example, a $0^{th}$-layer DoG image may be computed as a difference-of-Gaussian of a first Gaussian filter pair, the first Gaussian filter pair comprising a first filter with a standard deviation of 1 and a second Gaussian filter with a standard deviation of 2. A $1^{st}$-layer DoG image may be computed as a difference-of-Gaussian of a second Gaussian filter pair, the second Gaussian filter pair comprising a first filter with a standard deviation of 2 and a second Gaussian filter with a standard deviation of 3. A $2^{nd}$-layer DoG image may be computed as a difference-of-Gaussian of a third Gaussian filter pair, the third Gaussian filter pair comprising a first filter with a standard deviation of 3 and a second Gaussian filter with a standard deviation of 4. The standard deviations need not be integer values and other standard deviation values in a similar range may be used in other embodiments of the invention. The radius and shape of the Kernels of the Gaussian filters may be determined empirically by analyzing a plurality of training images comprising correctly annotated first and second dots and may be chosen such that a filter pair will generate DoG of high magnitude for dots of an expected size and shape, e.g. signals to be expected for a particular in-situ hybridization assay. Using multiple filter pairs may ensure that signals and dots of multiple different sizes are covered. Moreover, using multiple filter pairs will allow detection of dots which are in-focus and have a high contrast border as well as dots which are not in-focus and have a blurred outline in the original image.

(1b) an absorbance image (computed from an optical density domain representation of a RGB image);

(1c) unmixed images (e.g. in the context of dual ISH for HER2 detection, red and black image channels after color deconvolution, the steps of which are described more fully herein); and (2) Threshold or cutoff values set of various image channels:

(2a) global threshold on DoG0 (DoG0_threshold), which is empirically determined;

(2b) threshold on absorbance image (OD_threshold), which is set based on the contents of the absorbance image;

(2c) threshold on black unmixed image (black_threshold), which is set based on the contents of the black unmixed channel image; and (2d) threshold on red unmixed image (red_threshold), which is set based on the contents of the red unmixed channel image.

In general, the absorbance (an optical density representation (ROD, GOD, BOD) of a pixel (R,G,B) in 0-255 range may be represented by:

ROD=−log(R/BK); GOD=log(G/BK); BOD=−log(B/BK); where BK is an assumed background intensity assumed to be 240; then absorbance OD=sqrt(ROD*ROD+GOD*GOD+BOD*BOD). The BK value may be obtained empirically and may represent the typically observed background pixel intensity value for e.g. the glass of the slide. Typical values for glass pixel values are often in the range of 230-255.

In some embodiments, the unmixed channels are red and black unmixed channels (411 and 412), again obtained through color deconvolution (methods of color deconvolution or "unmixing" are disclosed further herein). Given a 3-channel color pixel in the optical density domain, color deconvolution indicates the contribution of the three contributing colors to the single pixel. In the context of dual ISH for HER2 detection, the colors of interest are red, black, and blue, where the red and black colors refer to the color of the dual ISH dots, while dark blue refers to the hematoxylin stain (which stains the cell nucleus). Known reference color vectors for red, black, and dark blue are available for color deconvolution and used in the computation of the respective unmixed images.

In some embodiments, the 0-th layer in a multi-scale DoG ("DoG0") is derived from the input image, and corresponds to the image obtained after taking the difference between the image filtered with the coarsest Gaussian (Gaussian with maximum standard deviation) and the image filtered with the next coarsest (Gaussian with the next highest standard deviation) Gaussian. Non-maximal suppression is run on the DoG0 image using a variety of different thresholds. Here, a threshold is determined as a fraction of DoG0max, where DoG0max is set as the maximum value derived from DoG0. Therefore, the value of "threshold" is varied as follows, where threshold=fraction*DoG0max, where fraction=1, 0.95, 0.85, . . . 0.15, 0.10, 0.05. As the "fraction" is reduced, the value of "threshold" is likewise reduced, resulting in an increased number of Dog0 based peaks, which ultimately reach a steady value. The minimum value of "fraction" for which the maximum number of DoG0 based peaks is determined and that "fraction" is defined as "fraction_used."

A DoG0_cuttoff value is then determined as follows:

DoG0_cutoff=min (fraction_used*DoGmax, DoG0_threshold), where the DoG0_threshold is empirically determined and sets an upper bound on the DoG0_cutoff value. In some embodiments, the DoG0_threshold ranges from about 0.015 to about 0.02. In some embodiments, the DoG0_threshold is 0.0175.

After the derived image inputs and threshold inputs are provided to the computer device or system, pixels are then computed based on the various derived image features (e.g. pixel intensities), provided that the derived image features meet the predetermined threshold criteria (defined above) to provide strong (e.g. high intensity) dot pixels for further processing (410, 411, 412). For example, the derived image features may be pixel intensity values and, when compared to the predetermined threshold intensity values, those pixels meeting the predetermined threshold intensity value are retained.

Dot pixels are computed where absorbance features and DoG features meet certain absorbance and DoG thresholds (410). According to embodiments, the absorbance threshold and the DoG threshold are identified such that they adapt to the actually present signal strength and only rarely identify noise as dot pixels.

For example, the dot pixels are computed where (i) DoG0 exceeds a cutoff (DoG0_cutoff); and (ii) absorbance exceeds a cutoff absorbance_cutoff (OD_threshold). This subset of pixels is determined and defined as S1 (420).

In some embodiments, the OD_threshold is computed as follows: OD_threshold=max(OD_values(round(0.25*|OD_values|)), 0.25*max(OD)), where OD_values is the sorted list of absorbance values in the cell (sorted in descending order); |OD_values| refers to the number of elements in OD_values; and max(OD) is the maximum of the absorbance channel.

A prospective set of black pixels (B1) (421) is defined such that unmixed black pixel strength exceeds a certain black pixel strength cutoff (black_threshold) and the DoG0 value also exceeds a certain cutoff (DoG0_cutoff) (411). Thus, prospective black pixels are determined by evaluating where black unmixed channel features exceed a certain black pixel strength threshold and where DoG features exceed a DoG threshold.

In some embodiments, the black_threshold is computed as follows: black_threshold=min(0.36*max(unmixed_black), UB(round(0.05*|UB|))), where unmixed_black refers to the black channel after unmixing; UB refers to the unmixed black channel (whose pixel values are sorted in descending order); and |UB| refers to the number of elements in the set UB.

Likewise, a prospective set of red pixels (R1) (422) is defined such that unmixed red pixel strength exceeds a certain red pixel strength cutoff (red_threshold) and the DoG0 value also exceeds a certain cutoff (DoG0_cutoff) (412). Thus, prospective red pixels are determined by evaluating where red unmixed channel features exceed a certain threshold absorbance and where DoG features exceed a DoG threshold.

For example, a black channel image generated by color deconvolution may be referred to as "UB" and may be x pixels wide and y pixels high. The UB image may comprise varying black channel intensities, also referred to as "UB values". The 2D matrix of black channel pixel intensities is transformed ("flattened") into a list (e.g. a vector) comprising x times y elements and respective UB-values. The list elements are sorted from brightest to lowest UB-value. Then, the element in the sorted list that is at position "5%×listsize" is identified. For example, in case the list comprises 1000 elements, the identified position would be 0.05×1000=50. As it may happen that said formula does not return an integer, the expression "5%×listsize" is rounded to the nearest integer. Thus, the formula "round(0.05*|UB|)" returns the integer position of the list element in a sorted UB-value list that demarks the highest 5% of UB values contained in the UB image. The expression UB(round (0.05*|UB|)) returns the UB-value of said particular list element. Said value can be considered as a kind of "UB-threshold", whereby 5% of all UB-values of the UB-image have an identical or higher value and 95% have a lower value.

Then, the minimum of the two values, 0.36*UB and UB(round(0.05*|UB|)) is identified and used as the "black_threshold".

In the following, an example with a UB-image consisting of an 8 by 8 pixel array is presented:

$$UB = \begin{matrix} 3 & 4 & 5 & 7 & 3 & 4 & 5 & 7 \\ 6 & 7 & 2 & 3 & 6 & 7 & 2 & 3 \\ 6 & 3 & 9 & 5 & 6 & 3 & 9 & 5 \\ 1 & 0 & 2 & 9 & 1 & 0 & 2 & 9 \\ 3 & 4 & 5 & 7 & 3 & 4 & 5 & 7 \\ 6 & 7 & 2 & 3 & 6 & 7 & 2 & 3 \\ 6 & 3 & 9 & 5 & 6 & 3 & 9 & 5 \\ 1 & 0 & 2 & 9 & 1 & 0 & 2 & 9 \end{matrix}$$

UB=flatten(UB)=3 6 6 1 3 6 6 1 4 7 3 0 4 7 3 5 2 9 2 5 2 9 2 7 3 . . . out to 64 elements UB=sort(flatten(UB))=9 9 9 9 9 9 9 9 7 7 7 7 7 7 7 6 6 6 6 6 6 6 5 5 . . . to 64 elements

|UB|, that is, numel(UB)=64, so round(0.05*numel (UB))=3

UB(round(0.05*numel(UB)))=9 because the third element in UB is 9. In fact, the first 8 elements in UB are 9.

black_threshold=min(cw*max(UB), UB(round(0.05*numel(UB)))); cw may be a constant value, e.g. 0.36. In this case, the black_threshold is computed as black_threshold=min(3.24, 9)=3.24, so the black_threshold is 3.24. Both the 0.05 and the cw parameter values may be determined empirically by testing a plurality of different values for said two parameters on a set of ground-truth images comprising correctly identified and annotated black and red dots and by determining which combination of parameter values is capable to most accurately identify the ground truth red and black dots in the training images.

This makes sure the threshold rejects noise without losing the most important signal information in the UB image. According to embodiments, instead of 0.05, a different value between 0 and 1, typically in the range of 0.04-0.06, can be used, and instead of the value 0.36, a different value between 0 and 1, typically in the range 0.30-0.42 can be used.

In some embodiments, the red_threshold is computed as follows: red_threshold=0.36*max(unmixed_red), where unmixed_red refers to the red channel after unmixing. According to preferred embodiments, the red_threshold is computed differently as the black_threshold as the black channel often comprises more noise that has to be filtered out.

Next, a union of the black dot pixels (B1) and the red dot pixels (R1) is selected by the computer device or system, where those pixels that meet a certain cutoff values are retained, e.g. (0.6*OD_threshold) (430). This high-absorbance set is referred to as (BR) (440).

Finally, a union of DoG0-absorbance-based-dots (S1) (420) and the red-black-absorbance-based-dots (BR) (440) is determined and used as the final set of dot pixels (D1) (450).

Generally, in case the stain has a color that is different from the color of typical noise (e.g. is of reddish or greenish color while the noise is predominantly black or blue, the threshold for said color channel is computed according the formula presented above for the red_threshold. In case the stain has a color that is similar or identical to the color of typical noise (e.g. is of black color while the noise is predominantly black or dark-grey), the threshold for said color channel is computed according the formula presented above for the black_threshold.

The computing of the union may utilize combinations of standard morphological operations including opening, closing, erosion, and dilation, as known to those of ordinary skill in the art. Morphological image processing is a collection of non-linear operations or techniques related to the shape or morphology of features in an image. Morphological techniques probe an image with a small shape or template called a structuring element. The structuring element is positioned at all possible locations in the image and it is compared with the corresponding neighborhood of pixels. Some operations test whether the element "fits" within the neighborhood, while others test whether it "hits" or intersects the neighborhood. When a structuring element is placed in a binary image, each of its pixels is associated with the corresponding pixel of the neighborhood under the structuring element. The structuring element is said to fit the image if, for each of its pixels set to 1, the corresponding image pixel is also 1. Similarly, a structuring element is said to hit, or intersect, an image if, at least for one of its pixels set to 1 the corresponding image pixel is also 1. The intersection of two sets A and B, denoted C=A∩B, is, by definition, the set of all elements that belong simultaneously to both sets A and B. Similarly, the union of two sets A and B, which is denoted C=A∪B, is, by definition, the set of all elements belonging to either the set A, or set B, or both sets simultaneously.

It is believed that the pixels returned in subset D1 (450) meet the established criteria, namely (1) dot pixels that are high enough in both difference of Gaussian (DoG) and absorbance; (2) black dot pixels that are high enough in a black unmixed image strength and DoG; and (3) red dot pixels that are high enough in red unmixed image strength and DoG). Based on this established criteria, dot detection is improved as compared with prior art detection methods, as described further herein (see, e.g., Example 1 herein).

In some embodiments, a "fill holes" operation is performed such that filled up dot-blobs are returned as the final set of dot pixels (460). A "hole" may be defined as a background region surrounded by a connected border of foreground pixels. The hole may be filled by a morphological operation, namely a conditional dilation operation. For example, let A be a set containing one or more connected components. An array $X_0$ is formed (of the same size as the array containing A), whose elements are zeros (background values), except at each location known to correspond to a point in each connected component in A, which is set to one (foreground value). The objective is to start with $X_0$ and find all the connected components by the following iterative procedure:

$$X_k = (X_{k-1} \oplus B) \cap A \quad k=1,2,3,\ldots$$

where B is a suitable structuring element. The procedure terminates when $X_k = X_{k-1}$ with $X_k$ containing all the connected components of A. The results of the dot detection module are then provided to a classification module. A "suitable structuring element" can be, for example, a disk-like structure having the size and shape of the types of dots to be detected. Said size and shape may be determined empirically by analyzing correctly identified and annotated dots in one or more training images. A "foreground" in this context is the area in the image that corresponds to cells, not to the glass of the slides (background). Typically, foreground detection does not comprise a cell detection step but may be used as the bases for performing a subsequent cell detection step.

Initial Dot Classification

Following dot detection with the dot detection module, a dot classification module 503 is run by the computer such that all of the dots pixels are assigned to black, red, or blue, where blue dot pixels, typically associated as part of the nuclear stain should not be counted as dot blobs.

Because multiple distinct spectral signals may co-exist in a single pixel in ISH, a color deconvolution algorithm is run on an image, where each pixel is unmixed into the three component channels (e.g. red, black, and dark blue channels), using pixels in the optical density domain (procedures for "unmixing" are described further herein). In some embodiments, multiple absorbance bins are utilized. In some embodiments, color deconvolution is performed using known reference color vectors (red, black, and dark blue) in each of the different absorbance bins. It is believed that the use of different absorbance bins allows for different unmixing operations to be run on pixels depending on the absorbance bin occupied by the pixel. The reference color vectors for red, black, and dark blue vary depending on the absorbance bin and, as a result, absorbance based unmixing is believed to be more accurate than when the same reference color vectors are used for all pixels.

The method of the present disclosure utilizes absorbance bins as follows: [0-0.4, 0.4-0.8, 0.8-1.2, and >1.2], where the absorbance (optical density domain) channel has been used. While initial reference vectors may be assigned for red, black and blue stains for all the four absorbance bins, depending on the image contents, the stain reference vectors can be modified so as to improve the color unmixing. For example, to assign meaningful initial values to the color reference vectors, about 5000 red, black and blue points were ground truthed and the median of the R,G,B color values (in the optical density domain) have been considered to define the reference vector for each stain. It is believed that by ground truthing such a large number of slides, it allowed for training based on a range of dot stain variability.

Following color deconvolution and training of the classification module/classifier, the dot pixels are classified by the computer device or system and as known to those of skill in the art. In some embodiments, the classification module is a Support Vector Machine ("SVM"). In general, a SVM is a classification technique, which is based on statistical learning theory where a nonlinear input data set is converted into a high dimensional linear feature space via kernels for the non-linear case. Without wishing to be bound by any particular theory, it is believed that support vector machines project a set of training data, E, that represents two different classes into a high-dimensional space by means of a kernel function, K. In this transformed data space, nonlinear data are transformed so that a flat line can be generated (a discriminating hyper plane) to separate the classes so as to maximize the class separation. Testing data are then projected into the high-dimensional space via K, and the test data are classified on the basis of where they fall with respect to the hyper plane. The kernel function K defines the method in which data are projected into the high-dimensional space.

In the context of dual ISH for HER2, the detected dots are classified as red, black, and/or blue dots. As an example, when the contribution of the black channel after color deconvolution is pre-dominantly high compared to the other two channels of red and blue, then that dot pixel is more likely to be classified as black; when the contribution of the red channel after color deconvolution is pre-dominantly high as compared to the other two channels of blue and black, then that dot pixel is more likely to be classified as red.

Refinement Module to Detect Additional Dots and Classify Others

In some embodiments and following dot detection (320) and classification (330) with the respective modules described herein, a refinement module 504 may also be run which comprises a series of operations used to enhance and clarify the initial dot detection and/or classification (340).

Those of skill in the art will recognize that some or all of these additional steps or processes may be applied to further enhance the dot detection and classification results provided above. While the steps below are disclosed with regard to dual ISH for HER2 detection, the skilled artisan will be able to adapt and modify the steps to accommodate any ISH probe or assays utilized. The skilled artisan will appreciate that not all of the operations described herein need to be performed to refine classification, and the skilled artisan will be able to pick and choose appropriate operations based on the outputs of the detection and classification modules and the images provided to the system.

Picking Up Missed Black and Red Dots (Dual ISH for Detecting HER2 Expression)

It is possible that certain black and/or red dot locations may be missed by an initial dot detection step, and these dot locations may be recovered using radial symmetry computed on the gradient magnitude image, obtained from images which have significantly high pixel intensities at black dot locations and/or red dot locations. For example, radial symmetry may be used to add back dot pixels that could have been missed by the dot detection module. Using radial symmetry on gradient magnitude image computed from the DoG2 channel on an absorbance image (2nd DoG channel in a multi-scale DoG framework), a votes magnitude image is saved which is expected to peak at locations corresponding to prospective black seeds. Using radial symmetry on gradient magnitude image computed from an A channel, a votes image is saved which is expected to peak at locations corresponding to prospective red seeds. Non-maximal suppression is then applied to the saved votes image, computed on the gradient image obtained from DoG2 used on absorbance, to obtain black seeds. Likewise, non-maximal suppression is applied to the saved votes image, computed on the gradient image computed on the A channel, to obtain red seeds.

In some embodiments, for multi-scale DoG, a sigma (standard deviation) of 0.6 was used for the x and y axes for the 2D Gaussian, and four scales with a step factor of 0.5 were used to vary the sigma between successive scales. The effective standard deviations of the different Gaussian kernels were 2.4, 1.2, 0.6, 0.3 and 0.15 as the computation proceeded progressively from coarser scales to finer scales.

In some embodiments, for black dot pickup, the radial symmetry method used had a minimum radius of 1 standard deviation for the first Gaussian filter and a maximum radius of 2 standard deviations for the second Gaussian filter. An angle of a conical section used for radial symmetry voting was pi/4. All of the pixels considered for radii symmetry voting had a gradient magnitude value exceeding 0.185. For non-maximal suppression based on radial symmetry voting, a neighborhood of 2 pixels was used. (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein.)

In some embodiments, for red dot pickup, the radial symmetry method used had a first Gaussian filter with a minimum radius of 2 standard deviations, a second Gaussian filter with a maximum radius of 5 standard deviations, an angle of the conical section used for radial symmetry voting was pi/4 radians, and all pixels considered for radii symmetry voting had gradient magnitude value exceeding 0.1. For non-maximal suppression based on radial symmetry voting, a neighborhood of 2 pixels was used.

Restoring High Optical Density Black Pixels as Dots

In some embodiments, a function is provided to the computer device to "fill up" pixels where optical density is high but which were mistakenly not included as dot pixels. It is believed that this may happen in interior pixels of big, black clusters where DoG may be low, resulting in interior pixels that may not have been marked. Here, connected components labeling is performed on the binary image, which is valued at 1 at all the black dot pixels and 0 otherwise. According to embodiments, clusters of black dots, which may be identified as black blobs, can occupy very large fractions of the nucleus, perhaps up to approximately 1000 pixels in area. Although such black dot clusters occur infrequently, they may be indicative of clinically relevant information. In general, connected components labeling scans an image and groups its pixels into components based on pixel connectivity, i.e. all pixels in a connected component share similar pixel intensity values and are in some way connected with each other. Once all groups have been determined, each pixel is labeled with a gray level or a color (color labeling) according to the component it was assigned to. Connected component labeling works by scanning an image, pixel-by-pixel (from top to bottom and left to right) in order to identify connected pixel regions, i.e. regions of adjacent pixels which share the same set of intensity values V. In some embodiments, an eight-neighborhood connected components algorithm is used In some embodiments, for every black connected component, those pixels within a neighborhood of 3 pixels are considered, and those pixels with a high enough absorbance value are identified. For the k-th black connected component, the mean of the absorbance of all black dot pixels corresponding to this connected component is denoted as meanOD(k). All pixels within a neighborhood of 3 pixels from the k-th black connected component, which have not been identified as either red or black dots, and having absorbance greater than or exceeding max(0.4, meanOD(k)) are considered as black pixels and are added back to the k-th black connected component.

Filtering Out Weak Dot Pixels

In some embodiments, models are constructed based on DoG0 and absorbance features, and based on black and blue pixels. From the black dot pixels, the computer device determines whether the dot pixel is closer to the black model or the blue model (e.g. by using radial symmetry, DoG0, and absorbance as features) to decide if the black dot pixel should be retained. For example, by comparing absorbance, radial symmetry, and DoG features of pixels from averaged features obtained for black pixels and blue pixels, bluish pixels wrongly identified as black may be discarded.

Checking for Additional Black Seeds

In some embodiments, radial symmetry voting is used on the gradient magnitude image computed on the absorbance image, the local maxima are identified, and these points are identified as black dot centers, unless they have a strong red content (as indicated by A channel). By this method, dot pixels are added where no black dot pixels are currently present and where DoG2 based radial symmetry predicts that a black dot-blob may be present, and where a red dot is not conflicting with potential black dot pixel locations.

Checking for Additional Red Seeds

In some embodiments, radial symmetry voting is used on the gradient magnitude image computed on A channel (in a LAB image), and the local maxima are identified as reds, unless a black dot blob already resides at that location. By this method, dot pixels are added where no red dot pixels are present and where A based radial symmetry predicts that a red dot-blob may be present, and where a black dot is not conflicting with potential red dot pixel locations.

Discarding Obvious Blue Pixels

In some embodiments, the computer device is provided with instructions to evaluate all the black dot pixels and cluster them into two groups—black and blue. Obvious blue pixels, which are retained as part of the black pixels, may be discarded after processing. The features used for the 2-class clustering are vote strength and absorbance. The intuition here is that for genuine black dot pixels, the black vote strength and absorbance are both expected to be higher than the blue dot pixels. Indeed, it has been empirically observed that for genuine black dot blobs, either the absorbance is high (as for dark black dots) or the vote strength (radial symmetry vote on absorbance) is high (e.g. single faint isolated dots can be low in absorbance but high in vote strength), or both. As such, based on these two features, a 2-class k-means clustering (see Linde, Yoseph, Andres Buzo, and Robert M. Gray. "An algorithm for vector quantizer design." Communications, IEEE Transactions on 28.1 (1980): 84-95, the disclosure of which is incorporated by reference herein) is performed to separate black pixels from blue pixels For example, to simplify the clustering problem, two features (absorbance and radial symmetry votes on gradient of DoG2 of absorbance) are combined into a single feature (F) for a given dot, where: F=min(1.5, absorbance for the seed)*max(0.82, radial symmetry vote at given seed), where the minimum and maximum limits have been empirically set so that the features of absorbance and radial symmetry vote can both be considered without the effect of one feature being much more dominant over the other.

Computing Features Based on Connected Components from Red and Black Dot Blobs

In some embodiments, all the black and red dot-blobs obtained after connected components analysis are considered, and the following features may be computed for each of the blobs:

average absorbance (a dot blob is believed to be darker than other non-dot pixels and hence, a valid dot blob should be higher in average absorbance);

max votes (for valid dot blobs, the radial symmetry based voting value is believed to be higher than the voting value at non-dot pixels);

average A (for valid red dot blobs, the average A value is believed to be higher than that at non-red dot pixels); and boundary shape term (for a red dot blob, the boundary shape term=(number of black dot pixels which are touching this red dot blob)/(number of pixels in the red dot blob); similarly, for a black dot blob, the boundary shape term= (number of red dot pixels which are touching this black dot blob)/(number of pixels in this black dot blob); thus for a proper dot blob, it is expected that the shape term should generally be low.

Discarding Certain Dot Blobs Based on Shape and Vote Strength

In some embodiments, dot-blobs of one color that are surrounded by dot-blobs of other colors and that have improper shape, may be discarded, unless they are very high in vote strength. For example, using shape heuristics, some black pixels (e.g. fringing of a red dot blob) or remnant red pixels (fringing of a black dot blob) may be discarded, such as described below. It is to be emphasized that some of the thresholds and parameters described herein have been adjusted according to other parameters used in other modules in the dot counting algorithm, such as radial symmetry based voting. While the general category of features and "shape/size/voting strength/absorbance" based identification of genuine and spurious black and red dot blobs holds true in general, the specific parameters used may depend on the specific implementation and parameters used in other modules herein.

All the red dot pixels are considered and, after connected components is performed, the boundary shape term and max votes term for all the red blobs is derived. When a red dot-blob has max votes greater than or equal to 15.5, it is retained as a red dot-blob. When a red dot-blob has a boundary shape term of less than 0.625, it is retained as a red dot-blob. For the other dot-blobs, further tests are conducted to decide if they should be retained. If, for example, the red dot-blob is less than 6 pixels in size and if it has a boundary shape term greater than 1, then the pixels corresponding to this red dot-blob are flipped from red to black. All the red dot-blobs retained so far are considered and the average absorbance (this has also been computed in earlier steps) for each red dot-blob is determined. A term called "max red OD" is then defined and set to max(0.79, max(average absorbance for all red dot-blobs)). Next, for each red dot-blob (which we are not yet sure about whether to retain), those pixels where the absorbance value exceeds "max red OD" are considered. These pixels are now flipped from red to black.

Next, attention is turned to the black dot pixels. In previous steps, after connected components, we have already computed the boundary shape term and the max votes term for all the black dot blobs. When a black dot-blob has max votes greater than 5, or when it has a boundary shape term less than 0.625, then the black dot blob is retained. For all the retained black dot blobs, we consider the average absorbance for each blob, and compute a term "min black OD" which equals min(0.3, 0.9*min(average absorbance computed for all retained black dot blobs)). For the remaining black dot blobs, if it has area less than 6 pixels and a shape boundary term greater than 1, then the pixels corresponding to this black dot-blob are flipped from black to red. For the other black dot-blobs (which we are not yet sure about whether to retain), we consider pixels where the absorbance is less than "min black OD", and these pixels are flipped from black to red.

Dot Counting Module

Following dot detection (320), classification (330), and refinement (340) (optional), the dots are counted and a ratio of the number of black dots to the number of red dots is computed (350) within a dot counting module 505.

Figure 6:
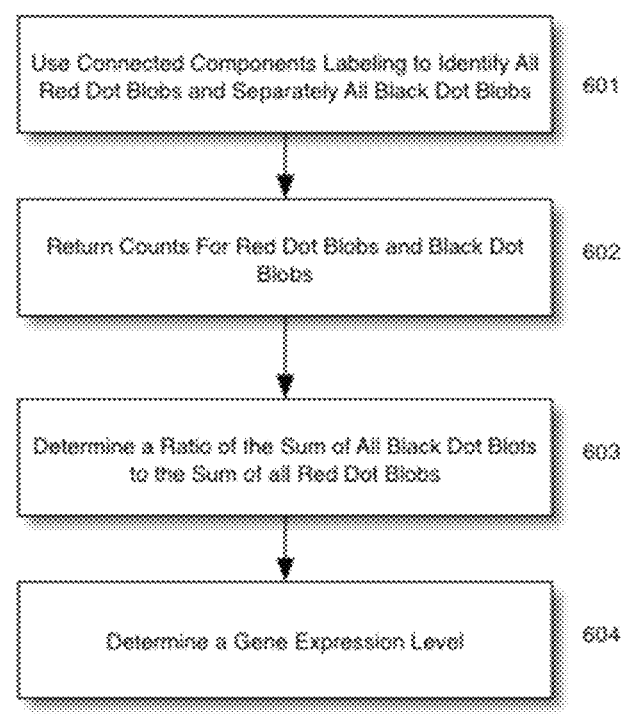
FIG. 6 provides a flowchart setting forth the steps of dot counting in some embodiments of the present disclosure.

Turning to FIG. 6, as an initial step, a connected components labeling process, the specifics of which have been described herein, is applied on all red dot pixels to identify the red dot blobs (601). Similarly, a connected components labeling is applied on the black dot pixels to obtain black dot blobs. In the context of dual ISH for HER2 detection, it is understood by those of skill in the art that black dots are generally smaller than red dots. As such, any counting rules must take this into consideration. The counting rules, of course, may be modified by those of skill in the art according to the specific ISH probes, assays, and protocols used.

An average black dot blob size (in pixels) is used to allocate a certain number of seeds to a black dot blob cluster. For a smaller black dot blob, it should have either, or both (i) vote strength (using DoG and radial symmetry on absorbance) greater than a certain threshold (e.g. empirically determined and set to 5); and/or (ii) absorbance greater than a certain absorbance threshold (e.g. empirically determined and set to 0.33).

For a smaller red dot blob, it should have either, or both (i) vote strength (using DoG and radial symmetry on A channel) greater than a certain threshold (e.g. empirically determined and set to 15); and/or (ii) an A channel value (from the LAB color space) (higher A is an indicator of redness) greater than a certain threshold (e.g. empirically determined and set to 133 where the A channel can take values from 0-255), and the absorbance should be greater than a certain threshold (e.g. empirically determined and set to 0.24). For example, a red dot with a diameter of less than 7 pixels may be considered as small red dot. Red dots with a diameter equal to or larger than 7 pixels may be considered as large red dots. The black dots may be larger on average, so a small black dot may have a diameter of less than 10 pixels and a large black dot may be a black dot with a diameter equal to or larger than 10 pixels.

Once the black and red dot blobs are identified, counts are returned for black and red dot blobs (602). The final score of a dual ISH whole slide image is the ratio of the (sum of all the black dots counted from all cells)/(sum of all the red dots counted from all cells) (603). Based on the ratio, the expression level can be determined to be an over-expression, under-expression, etc. (604).

If 20 cells are present for the given FOV(s), the score is defined as:

Score=$(\Sigma Bi)/(\Sigma Ri)$, where the score is computed for all i where both Bi and Ri are >0, where the cell score is "Bi" (number of black dots picked for the i-th cell) and "Ri" (number of red dots picked for the i-th cell), then for the i-th cell, the final score for that slide is computed as:

The score is grouped into 3 bins:
i) Bin 1: score<=1.8
ii) Bin 2: score>1.8 and score<=2.2
iii) Bin 3: score>2.2

Bin 1 represents under expression of the HER2 gene and thus the gene is "non-amplified"; bin 3 represents over expression of the HER 2 gene and thus the gene is amplified. When the score is between 1.8 and 2.1, the pathologist picks 20 more cells, in the hope that the score, using the 20+20 cells, is either clearly less than 1.8 or clearly greater than 2.2.

Figure 7:
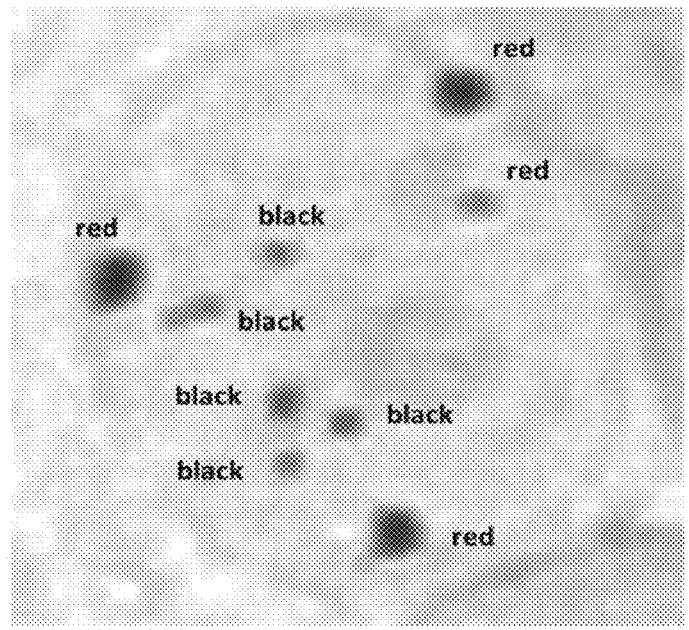
FIG. 7 depicts a sub-region of a tissue sample image comprising first (black) and second (red) dots.

FIG. 7 depicts a sub-region of an image comprising first (black) and second (red) dots. The picture shows that the black dots are generally faint (not visually "black enough" to the eye) and the red dots are generally dark (not generally "red enough" to the eye). Black dots are generally small and red dots are bigger and fringing effects associated with the bigger red dots exist. Thus, dot detection and classification in Dual ISH images is associated with a plurality of problems related to e.g. bad focus, staining and contrast variations, overlapping dots and fringing effects.

FIG. 8 depicts the process of extracting reference color vectors for different absorbance bins. One or more training images 802 are manually analyzed and first 806 and second 808 dots are identified and annotated. Said annotated training images and respective dots are used as a "ground truth" data set and are used for empirically determining the various thresholds described herein, e.g. the absorbance threshold, color-channel-specific intensity thresholds and so on.

In addition, an absorbance image 802 is computed from the training image 804 as described already before. By mapping the absorbance image to the training image 802, the absorbance values of respective pixels in the training image 802 can be derived.

Figure 8A:
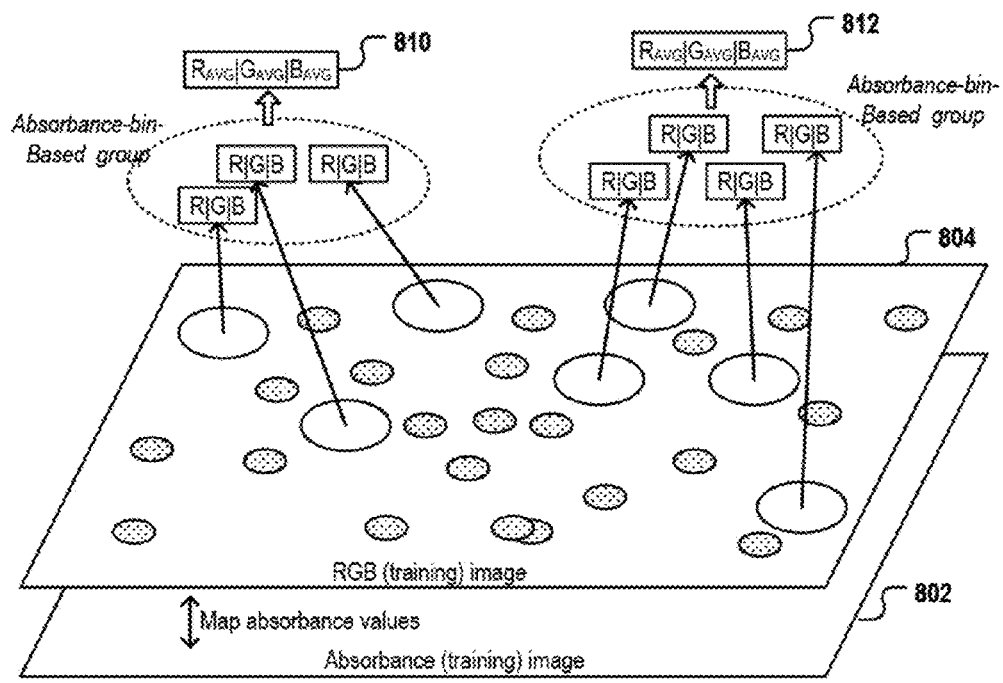
FIGS. 8A and 8B depict the process of extracting reference color vectors for different absorbance bins.

According to FIG. 8*a*, for each of the second dots, an RGB color vector is derived by computing the average R, the average G and the average B values of all pixels contained in said second dot.

Then, the second dots are assigned to two or more different groups according to their absorbance values. For example, an average absorbance value of all pixels in a second dot could be computed or the absorbance value at the center pixel of a second dot could be chosen. So the two dotted ellipses of FIG. 8A show two different groups of second dots grouped by their absorbance values to respective groups, each group corresponding to a predefined absorbance bin. It is possible to use only a single set of absorbance bins, but preferentially two different sets of absorbance bins for grouping the first dots and the second dots are used.

From all RGB color vectors of a group, a reference color vector is computed. For example, for the two absorbance-bin based groups of second dots depicted in 8*a*, two reference color vectors 810, 812 are computed by computing the average R, average G and average B values of all RGB vectors contained in said group.

Thus, at the end of the pre-processing process depicted in FIG. 8A, for two different absorbance bins, two respective reference color vectors 810, 812 have been extracted from the one or more training images 804.

Figure 8B:
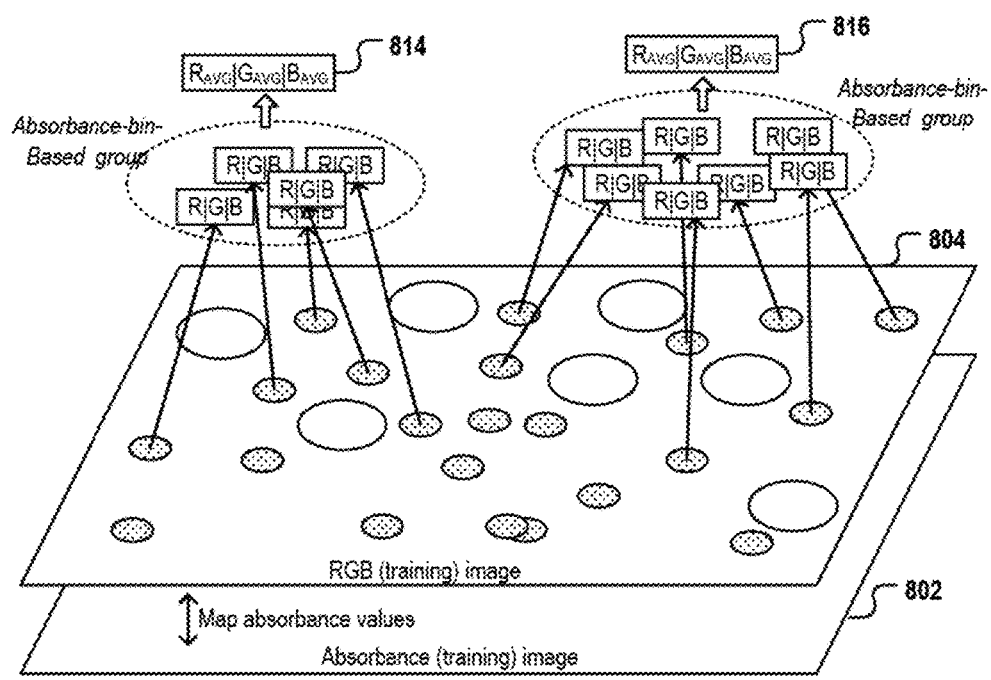

According to FIG. 8*b*, for each of the first dots, an RGB color vector is derived by computing the average R, the average G and the average B values of all pixels contained in said second dot.

Then, the first dots are assigned to two or more different groups according to their absorbance values. For example, an average absorbance value of all pixels in a first dot could be computed or the absorbance value at the center pixel of a first dot could be chosen. So the two dotted ellipses of FIG. 8*b* show two different groups of first dots grouped by their absorbance values to respective groups, each group corresponding to a predefined absorbance bin.

From all RGB color vectors of a group, a reference color vector is computed. For example, for the two absorbance-bin based groups of first dots depicted in 8*b*, two reference color vectors 814, 816 are computed by computing the average R, average G and average B values of all RGB vectors contained in said group.

Thus, at the end of the pre-processing process depicted in FIG. 8*b*, for two different absorbance bins, two respective reference color vectors 814, 816 have been extracted from the one or more training images 804.

The color deconvolution is performed with different pairs of reference color vectors generated from the first and second training dots. The color deconvolution algorithm at first determines, for color-deconvolution of a first sub-region of the image, an absorbance value of said sub-region. This can be, for example, an average or median absorbance value. Then, the color deconvolution algorithm identifies an absorbance bin comprising said absorbance value of said sub-region. In case different absorbance bins for the first and second dots are used, a first absorbance bin (used for the first dots) and a second absorbance bin (used for the second dots) comprising said absorbance value of the sub-region are identified. Then, the one reference color vector 814 having been empirically determined for a plurality of first dots for the identified bin (or for the identified first bin) is selected. In addition, the one reference color vector 810 having been empirically determined for a plurality of second dots for the identified bin (or for the identified second bin) is selected. The selected first and second reference color vectors 810, 814 are used for color deconvolution of said sub-region of the image. Said steps are repeated for each sub-region of the image to be processed, thereby respectively selecting a pair of reference color vectors in dependence on the absorbance value of said sub-region. In case more than two types of dots are to be identified and/or in case the color deconvolution should generate more than two channels, additional reference color vectors are identified and selected for each additional channel accordingly.

In one aspect, the invention relates to the invention relates to an image processing method for detecting first and second dots representing in-situ hybridization signals of different color. The method is implemented in an image analysis system. The first and second dots are contained in a digital image of a tissue sample. The pixel intensity values of the first dots indicate in situ hybridization signals generated by a first stain having a first color. The pixel intensity values of the second dots indicate in situ hybridization signals generated by a second stain having a second color. The detection of the first and second dots in the digital image comprises:

generating a first color channel image and a second color channel image via color deconvolution of the digital image, the first color channel image corresponding to the color spectrum contribution of the first stain and the second color channel image corresponding to the color spectrum contribution of the second stain;

computing at least one DoG image from the digital image by applying a pair of Gaussian filters whose Kernels have a different standard deviation to the digital image and by subtracting the two filtered images output by the Gaussian filters from each other, the DoG image being a difference-of-Gaussian image;

computing an absorbance image from the tissue sample image;

detecting sets of adjacent pixels in the digital image whose absorbance values in the absorbance image exceed an absorbance threshold and whose DoG values in the DoG image exceeds an DoG threshold and using the detected sets of adjacent pixels as prospective dots;

identifying the ones of the prospective dots whose intensity values in the first color channel image exceeds a first-color-intensity threshold and using said identified prospective dots as the detected first dots; and identifying the ones of the prospective dots whose intensity values in the second color channel image exceed a second-color-intensity threshold and using said identified prospective dots as the detected second dots.

The use of both DoG values, absorbance values and intensity values of image channels computed by a color deconvolution step as described above may be advantageous as the detection and classification of colored dots in an image is often hampered by a plurality of different error sources such as poor focus, optical fringing, reddish background, faint color signals, speckling, very dark blue hematoxylin blobs and others. Using the above described stepwise approach of detecting dots relating to stains of different color may significantly increase error robustness and accuracy of dot detection and classification, whereby the dot detection method can be performed very quickly and requires only limited computational resources.

According to embodiments, the method further comprises calculating a ratio of first dots and second dots; and outputting the ratio via a user interface. For example, the ratio may be output to a user via a command line interface or via a graphical user interface.

The absorbance image can be computed as the common logarithm of the ratio of incident to transmitted spectral radiant power through a material, e.g. the slide with the tissue sample.

According to embodiments, the image of the tissue sample is an RGB image and/or the method comprises generating an RGB image from the digital image of the tissue sample. The absorbance image is generated by representing the R, G and B components of each pixel in the RGB image as ROD, GOD and BOD components of said pixel according to the formulas: ROD=−log(R/BK); GOD=log(G/BK); BOD=−log(B/BK), where BK is an assumed background intensity, and computing for each of the pixels in the absorbance image an absorbance value OD according to OD=sqrt(ROD*ROD+GOD*GOD+BOD*BOD).

Generating an absorbance image may be advantageous since the spectral absorbance image is not affected by the illuminant.

According to embodiments, the first stain is an in situ hybridization stain that selectively binds to HER2 genes. The first stain may have black color and be, for example, a silver-stain. The second stain is an in situ hybridization stain that selectively binds to the centromer of chromosome 17. The second stain may have red or reddish color.

For example, the ratio may indicate the ratio of different types of genes or may indicate the ratio of the number of copies of a particular gene and the number of copies of a particular chromosome comprising said gene. Said ratios may be a great help for determining genetic and chromosomal changes in a tumor cell and for predicting a diagnosis or a risk for a particular disease or symptom.

According to embodiments, the method comprises identifying an area in the digital image that corresponds to a cell in the tissue sample and identifying the first and second dots in each of the cells (i.e., in each of the identified pixel areas representing a cell).

According to embodiments, the method further comprises computing the DoG threshold as a cell-specific DoG threshold $\text{DoG\_threshold}_{Cell}$ according to $$\text{DoG\_threshold}_{Cell} = \min(\text{fraction\_used} * \text{DoGmax}_{Cell}, \text{DoG\_threshold}_{Global})$$

wherein $\text{DoGmax}_{Cell}$ is the maximum DoG value observed in the DoG image area covered by the identified cell;

wherein the fraction_used is a predefined value between 0 and 1, preferentially between 0.2 and 0.3 [e.g. 0.25]; and wherein $\text{DoG\_threshold}_{Global}$ indicates a global threshold that sets an upper bond to the threshold the $\text{DoG\_threshold}_{Cell}$, the $\text{DoG\_threshold}_{Global}$ having been obtained empirically by analyzing DoG values of a plurality of dots having been correctly identified in one or more training images.

Said features may be advantageous as a locally adapted (e.g. cell-wise adapted) threshold for the DoG value is provided that may yield a better accuracy of dot detection than state of the art approaches. This is because cells may be stained to a different degree and this may affect also the DoG values derived from the original tissue sample image. By using locally adapted DoG thresholds which take into account also "global" knowledge on how a DoG threshold should be chosen, one can accurately identify dots that correspond to an in situ hybridization signal rather to an artifact. The global the DoG_threshold$_{Global}$ is a DoG threshold value having been empirically identified as a DoG threshold value capable of selectively identifying dots caused by a hybridization signal. For example, the DoG_threshold$_{Global}$ may have a value of 0.0175.

According to embodiments, the method further comprises:

computing a plurality of different fraction values fraction$_{cand}$, each fraction value being a value larger than 0 and smaller than 1; said values may also be considered as "candidate fraction values";

computing for each of the fraction values fraction$_{cand}$ and for each of the cells a respective candidate DoG threshold DoG_threshold$_{CellCand}$ according to DoG_threshold$_{CellCand}$=min
(fraction$_{cand}$*DoGmax$_{Cell}$,DoG_threshold$_{Global}$);

identifying the minimum fraction value ("fraction_used") for which a maximum number of DoG peaks above a predefined DoG peak threshold are obtained for the cell; and using the identified fraction value as the fraction_used value that is used for computing the DoG threshold DoG_threshold$_{Cell}$ used for identifying the dots in the cell: DoG_threshold$_{Cell}$=min(fraction_used*DoGmax$_{Cell}$, DoG_threshold$_{Global}$);

The above described way of dynamically identifying and computing the fraction used value and the corresponding DoG threshold value may have the advantage that the DoG threshold actually used for detecting the dots is capable of filtering out noise. The noise caused by staining artifacts and other sources of errors may not result in DoG peaks exceeding the predefined DoG peak threshold. By selecting a low fraction_used value and, correspondingly, a low DoG threshold for a cell, many DoG peaks may be identified, but the DoG threshold will typically be high enough to filter out background noise.

According to embodiments, the method comprises running a non-maximal suppression algorithm on the DoG image. Thereby, the DoG image is scanned for local DoG maxima ("DoG peak regions") whose DoG values exceed the DoG threshold, and if pixels are not part of the local DoG maxima they are set to zero. This has the effect of suppressing all image information that is not part of local maxima. Preferentially, the non-maximal suppression algorithm is run with a neighborhood distance of a few pixels, typically 2 pixels. This means that the size, e.g. the radius, of each detected local maxima in the DoG image is extended by the neighborhood distance, e.g. by 2 pixels, thereby slightly enlarging the local DoG maxima. This may make sure that the pixels at the borders of cellular structures marked by a particular stain are not lost.

According to embodiments the method further comprises computing the absorbance threshold as a cell-specific absorbance threshold OD_threshold$_{Cell}$ according to OD_threshold$_{Cell}$=max(OD_values(round
(fractionOD*|OD_values|)),fractionOD*max
(OD)).

Thereby, OD_values is the sorted list of absorbance values in the cell, |OD_values| refers to the number of elements in the sorted list OD_values, and max(OD) is the maximum of the absorbance image value observed in the absorbance image in the area covered by the identified cell. The fractionOD_used is a predefined value between 0 and 1, preferentially between 0.2 and 0.3, e.g. 0.25.

For example, an absorbance image ("OD image") is computed as a derivative of the digital image. In the absorbance image, each pixel may have assigned an absorbance value "OD". The OD image may be x pixels wide and y pixels high. The OD image may comprise absorbance values, also referred to as "OD values". The 2D matrix of absorbance values is transformed ("flattened") into a list (e.g. a vector) comprising x times y elements and respective OD-values. The list elements are sorted from brightest to lowest OD-value. Then, the element in the sorted list that is at position "fractionOD×listsize", e.g. "25%×listsize" is identified. The expression "25%×listsize" is rounded to the nearest integer. Thus, the formula "round(0.25*|OD|)" returns the integer position of the list element in a sorted OD-value list that demarks the highest fractionOD % of OD values contained in the absorbance image. The expression OD_values(round(fractionOD*|OD|)) returns the OD-value of said particular list element. Said value can be considered as an absorbance-threshold (OD_threshold$_{Cell}$) computed individually for each cell, whereby e.g. 25% of all OD-values of the absorbance image have an identical or higher value and 75% have a lower value.

Said features may be advantageous as a locally adapted (here: cell-wise adapted) threshold for the absorbance value is provided that may yield a better accuracy of dot detection. This is because cells may be stained to a different degree and this may affect also the absorbance values derived from the original tissue sample image.

According to embodiments the method further comprises computing the first-color-intensity threshold TB as a cell-specific first-color-intensity threshold according to TB=min(B_fraction*max(BL intensity values),
(BL_value(round(cb*|BL|))).

Thereby, B_fraction is a predefined value between 0 and 1, e.g. between 0.3 and 0.4, e.g. 0.36. "cb" is a predefined value between 0 and 1, preferentially between 0.04 and 0.06, e.g. 0.05. "BL intensity values" is the totality of intensity values in the first color channel image covered by the cell area. BL is a sorted list of the BL intensity values in the cell. |BL| refers to the number of elements in the sorted list BL, and max(BL intensity values) is the maximum of the intensity values observed in the first color channel image in the area covered by the identified cell.

According to embodiments, the method comprises computing the second-color-intensity threshold TR as a cell-specific second-color-intensity threshold according to TR=R_fraction*max(RL intensity values). Thereby, the R_fraction is a predefined value between 0 and 1, e.g. between 0.3 and 0.4, e.g. 0.36. "RL intensity values" is the totality of intensity values in the second color channel image covered by the cell area.

For example, the first color channel may correspond to a black image channel generated by color deconvolution and the second color channel may correspond to a red color channel generated by color deconvolution. Accordingly, TB may correspond to the "black_threshold" and TR may correspond to the "red_threshold". Generally, in case the first stain has a first color that is similar or identical to the color of typical noise (e.g. is of black color while the noise is predominantly black or dark-grey), the threshold for said first color channel is computed according the formula presented above for the black_threshold or the BT threshold. In case the first stain has a first color that is dissimilar to the color of typical noise (e.g. the first stain is of red or green color while the noise is predominantly black or dark-grey), the threshold for said first color channel is computed according the formula presented above for the red_threshold or the RT threshold. This applies analogously for the second stain. This makes sure the threshold rejects noise without losing the most important signal information in the first color channel image. As was explained above for the red and black thresholds, the parameter values and fraction values may be derived empirically by evaluating thresholding results obtained based on said parameter values on ground truth data. According to embodiments, instead of 0.5, a similar value typically in the range of 0.4-0.6 can be used, and instead of the value 0.36, a similar value in the range 0.30-0.42 can be used.

Next, a union of the pixels of the first and second dots is computed, where those pixels that meet a certain absorbance threshold are retained, e.g. $(0.6*OD\_threshold_{Cell})$.

According to embodiments, the generation of the first and second color channel images comprises:

analyzing a plurality of first training dots in one or more training images, the pixel intensity values of the first training dots correctly and selectively indicating in situ hybridization signals generated by the first stain, thereby extracting at least one first reference color vector representing the optical signal spectrum provided by the first stain;

analyzing a plurality of second training dots in the one or more training images, the pixel intensity values of the second training dots correctly and selectively indicating in situ hybridization signals generated by the second stain, thereby extracting at least one second reference color vector representing the optical signal spectrum provided by the second stain;

using the at least one first and second reference color vectors for determining the color spectrum contribution of the first and second stain when performing the color deconvolution.

According to embodiments, the generation of the first and second reference color vectors comprises:

identifying a first tuple of R, G B values being typical for the first dots by computing the mean or average R, G and B values of all pixels contained in the first training dots;

using the first tuple of R, G and B values as the at least one first reference color vector;

identifying a second tuple of R, G B values being typical for the second dots by computing the mean or average R, G and B values of all pixels contained in the second training dots; and using the second tuple of R, G and B values as the at least one second reference color vector.

According to embodiments, the at least one first reference color vector is a plurality of first reference color vectors, the at least one second reference color vector is a plurality of second reference color vectors, the method comprising:

defining a number of absorbance bins, the absorbance bins being non-overlapping, numerical ranges comprising only non-negative numbers;

for each of the first training dots, computing a first reference absorbance value OD1 by transforming the first tuple of R, G and B values into $ROD_1$, $GOD_1$ and $BOD_1$ values being typical for a first dot according to the formulas: $ROD_1=-\log(R/BK)$; $GOD_1=\log(G/BK)$; $BOD_1=-\log(B/BK)$ and according to $OD1=\sqrt{ROD_1*ROD_1+GOD_1*GOD_1+BOD_1*BOD_1}$, where BK is a background intensity; thus, the first the reference absorbance value is an empirically determined value that is typical for a first dot, i.e., a dot in a digital image generated by an in-situ hybridization signal of the first stain, e.g. a silver stain;

for each of the second training dots, computing a second reference absorbance value OD2 by transforming the second tuple of R, G and B values into $ROD_2$, $GOD_2$ and $BOD_2$ values being typical for a second dot according to the formulas: $ROD_2=-\log(R/BK)$; $GOD_2=\log(G/BK)$; $BOD_2=-\log(B/BK)$ and $OD2=\sqrt{ROD_2*ROD_2+GOD_2*GOD_2+BOD_2*BOD_2}$, where BK is a background intensity; thus, the second reference absorbance value is an empirically determined value that is typical for a second dot, i.e., a dot in a digital image generated by an in-situ hybridization signal of the second stain, e.g. a red fluorescent stain;

grouping all first training dots into different first groups according to their respective first reference absorbance values OD1, wherein all first training dots whose first reference absorbance value are contained in the same absorbance bin are grouped into the same first group;

grouping all second training dots into different second groups according to their respective second reference absorbance values OD2, wherein all second training dots whose second reference absorbance value are contained in the same absorbance bin are grouped into the same second group;

for each of the first groups, computing a bin-specific first reference color vector by computing the mean or average R, G and B values of all pixels contained in the first training dots having been grouped into said first group;

using the bin-specific first reference color vectors as the plurality of first reference color vectors;

for each of the second groups, computing a bin-specific second reference color vector by computing the mean or average R, G and B values of all pixels contained in the second training dots having been grouped into said second group; and using the bin-specific second reference color vectors as the plurality of second reference color vectors.

According to embodiments, a first set of absorbance bins is used for grouping the first training dots and a second set of absorbance bins is used for grouping the second training dots. The first and second sets of absorbance bins comprise bins of different absorbance ranges. For each bin in the first set of absorbance bins, a respective first reference color vector is computed. For each bin in the second set of absorbance bins, a respective second reference color vector is computed.

According to embodiments, the absorbance bins for the first groups are determined by analyzing a first histogram of the occurrence frequencies of first reference absorbance values OD1 of all first training dots and selecting the bins such that each bin comprises approximately the same number of first training dots. In addition or alternatively the absorbance bins for the second groups are determined by analyzing a second histogram of the occurrence frequencies of second reference absorbance values OD2 of all second training dots and selecting the bins such that each bin comprises approximately the same number of second training dots.

According to embodiments the method further comprises:

upon performing the color deconvolution, identifying an absorbance value in a sub-region of the absorbance image corresponding to a sub-region of the digital image that is currently processed by the color deconvolution;

identifying at least one absorbance bin comprising said identified absorbance value;

identifying the first and second reference color vectors having been computed for the at least one identified absorbance bin; and using the identified first and second reference color vectors for determining the color spectrum contribution of the first and second stain when performing the color deconvolution for said image sub-region.

The determination of absorbance-bins in the training images, the use of the absorbance bins for grouping training first and second dots into groups of different absorbance, the bin-specific computation of first and second reference color vectors from the training images and a color deconvolution algorithm that locally adapts to the optical density values of the tissue sample image to be color deconvoluted by selecting first and second reference color vectors having been generated from training image data having a similar absorbance value may significantly increase the quality of color deconvolution. In particular when performing color deconvolution for biological specimen, the absorbance may vary greatly due to different kinds of factors, e.g. the staining intensity, variability of the diffusion rate of the stain into the tissue, and so on. Using a color deconvolution algorithm that dynamically adapts to the local absorbance values of the image may thus increase the color deconvolution process and thus may increase the quality of the color channel images generated.

According to embodiments the computation of the at least one DoG image from the digital image comprises computing a plurality of DoG images from the digital image by:

computing a first DoG image from the digital image by applying a first pair of Gaussian filters whose Kernels have a different standard deviations to the digital image and by subtracting the two filtered images output by the first pair of Gaussian filters from each other; and computing at least a second DoG image from the digital image by applying a second pair of Gaussian filters whose Kernels have a different standard deviations to the digital image, the second pair of Gaussian filters differing from the first pair of Gaussian filters, and by subtracting the two filtered images output by the second pair of Gaussian filters from each other.

The detecting of the sets of adjacent pixels in the digital image comprises detecting the sets of adjacent pixels in the digital image whose absorbance values in the absorbance image exceed an absorbance threshold and whose DoG values in the DoG image exceeds an DoG threshold in at least one of the plurality of DoG images and using the detected sets of adjacent pixels as prospective dots.

According to embodiments, the method further comprises refining the sets of adjacent pixels used as the prospective by removing one or more of the prospective dots and/or by adding additional adjacent pixel areas to the identified prospective dots.

According to embodiments, the method further comprises computing a gradient magnitude image from the absorbance image, the gradient magnitude image comprising, at each of its pixels, a gradient magnitude value indicating the amount of a change in the absorbance value in the absorbance image in respect to one or more neighbor pixels; identifying sets of adjacent pixels whose gradient magnitude in the gradient magnitude image exceeds a gradient magnitude threshold; and in case one of said identified sets of adjacent pixels has not already been used as prospective dot, adding said identified set of adjacent pixels to the identified prospective dots.

Contrary to a gradient image, a gradient magnitude image may selectively comprise the magnitude but not the directions of the change in an intensity, color or other image feature value. For example, the gradient magnitude image can be computed from the absorbance image by applying a pair of Gaussian filters whose Kernels have a different standard deviation to the absorbance image and by subtracting the two filtered absorbance images which are output by the Gaussian filters from each other. Thus, the gradient magnitude can be a difference-of-Gaussian image computed from the absorbance image by applying said pair of DoG filters.

This may be advantageous as it allows the identification of dots which may have been missed in the DoG image derived from the original tissue sample image but which may generate a stronger signal in an image derived from the absorbance image. This may be particularly helpful for identifying missed black dots. According to other embodiments, a gradient magnitude image is computed from a color channel that largely corresponds to the optic spectrum of a particular stain. For example, the gradient magnitude image may be computed from a color channel of a LAB color space image, e.g. the A-channel. A gradient magnitude image derived from an A-channel LAB color space image can be used for identifying missed red dots. In general, using a LAB color space representation is advantageous as this color space separates brightness from color (i.e., the "redness" or "greenness" of a dot). Thus, optical features and patterns of dots of a particular color may be particularly prominent in a color channel of the LAB color space that corresponds to the spectrum of the dot and the respective stain whose signal is represented in the dot.

According to embodiments, the refinement process removes third dots wrongly detected as first dots by performing a 2-class k means clustering of all dots having initially been detected as first dots. The 2-class k-means clustering takes an average or median absorbance value of each of said first dots and a radial symmetry vote strength of each of said first dots as input. The absorbance value is derived from corresponding pixels in the absorbance image. The radial symmetry vote strength is a data value assigned to the center pixel of a dot and being indicative of the radial symmetry of said dot.

According to embodiments, the radial symmetry vote strength is computed by:

computing a gradient image from the absorbance image, the gradient image comprising, at each of its pixels, a direction and a gradient magnitude value, the gradient magnitude value indicating the amount of a change in the absorbance value in the absorbance image in respect to one or more neighbor pixels and a direction, the direction indicating the change in absorbance across the neighbor pixels;

performing a voting operation whereby each of the pixels casts a vote along the gradient direction to one or more neighbor pixels;

computing, at least for the pixels located at the center of the first dots, an aggregated vote strength, the aggregated vote strength aggregating the votes cast by the neighbor pixels on said pixels at the dot center, the aggregated vote strength being indicative of the degree of radial symmetry of the first dot.

According to embodiments, the refinement discards fringing first color pixels from second dot blobs and discards fringing second color pixels from first dot blobs by applying dot-shape-related heuristics to the digital image of the tissue sample.

For example, a dot shape related heuristics (implemented e.g. in the form of rules) may specify that in case a first dot of about 3-7 pixels in diameter is completely or partially outlined by a thin pixel belt of second color pixels, the belt width being only 1-2 pixels, the pixels of the thin belt should actually be assigned to said first dot even though the second color may indicate a different object class. According to another example, a dot shape related heuristics may specify that in case a second dot of about 3-7 pixels in diameter is completely or partially outlined by a thin pixel belt of first color pixels, the belt width being only 1-2 pixels, the pixels of the thin belt should actually be assigned to said second dot even though the first color may indicate a different object class.

According to embodiments, the refinement assigns first color pixels fringing a second dot to said second dot and assigns second color pixels fringing a first dot to said first dot. A "first color pixel" is a pixel whose color is mainly or completely the first color. A "second color pixel" is a pixel whose color is mainly or completely the second color. The method further comprises re-execution of the identification of the first and second dots, whereby the fringing pixels assigned during the refinement remain assigned to the respective first and second dots.

By recomposing the first and second dot identification based on a modified and optionally enlarged silhouette of the first and second dots, a more accurate detection and classification of dots relating to staining signals of different color may be obtained.

According to embodiments, the first dots correspond to hybridization signals of the first stain selectively binding to a first sequence. The second dots correspond to optical signals of the second stain. The second stain selectively binds to a second DNA sequence located on the same chromosome as the first DNA sequence or selectively binds to a centromer of said chromosome. The ratio is determined for determining if an amplification of the first DNA sequence is caused by an amplification of the chromosome comprising the first DNA sequence.

Amplification of the human epidermal growth factor receptor 2 (HER2) gene and attendant protein overexpression are present in 10% to 20% of primary breast cancers. HER2 overexpression and/or gene amplification is a negative overall prognostic marker, as confirmed in gene array studies. HER2 status also predicts sensitivity to anthracycline-based chemotherapy regimens as well as relative resistance to cyclophosphamide-based regimens and tamoxifen-based therapies in the setting of estrogen receptor-positive breast cancers.

In a further aspect, the invention relates to an image analysis device comprising one or more processors and at least one memory. The at least one memory stores non-transitory computer-readable instructions for execution by the one or more processors to cause the one or more processors to execute the method according to any one of the embodiments of the invention described herein.

In a further aspect, the invention relates to a non-volatile computer readable storage medium comprising non-transitory computer-readable instructions for execution by one or more processors to cause the one or more processors to execute the method according to any one of the embodiments of the invention described herein.

Additional Embodiments and Procedures

Any of the images evaluated by the computer system may be pre-processed prior to any identification of features, computation of metrics, or evaluation by the computer system. For example, noise reduction filters and other enhancing filters may be run as known to those of ordinary skill in the art. The processes disclosed herein may also be repeated any number of times to evaluate any desired areas of interest.

The system, in some embodiments, includes a computing system that automatically counts the first and second hybridization signals. In certain embodiments, one or both of the first and second hybridization signals are non-fluorescence signals. The non-fluorescence signals can be a silver in situ hybridization signal, a red in situ hybridization signal, or the like. In some embodiments, one signal is a silver in situ hybridization signal ("SISH") that indicates a HER2 gene and another signal is a red in situ hybridization signal that indicates chromosome 17.

In some embodiments, a system for detecting an expression level of genes includes memory and a processor. The memory can store a sequence of program instructions. The genes or chromosome may appear as dots in the image of the specimen.

The computer system of the present disclosure may be tied to a specimen processing apparatus which can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or nonaqueous-based antigen retrieval solutions, antigen recovering buffers, etc.), or the like.

Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes. For example, probes can include, without limitation, a hapten-labeled specific binding moiety, a DNA probe (e.g., DNP-labeled DNA probe), a nitroaryl compound, dinitrophenol, an electron-deficient aromatic compound, a probe hybridization solution, or other type of ISH probes. ISH can involve a labeled complementary DNA or RNA strand (i.e., probe) to localize a specific DNA or RNA sequence in a portion or section of tissue (in situ), or, if the tissue is small enough, in the entire tissue (whole mount ISH).

In some embodiments, a cocktail assay applied by the processing apparatus includes different reagents. For example, one cocktail assay includes the ULTRAVIEW SISH Detection Kit (Ventana Medical Systems, Inc., p/n 780-001), the INFORM HER2 DNA Probe (Ventana Medical Systems, Inc., p/n 780-4332), the Rabbit Anti-DNP Antibody (Ventana Medical Systems, Inc., p/n 780-4335), the Rabbit Anti-HER2 (4B5) Antibody (Ventana Medical Systems, Inc., p/n 800-2996), the ULTRAVIEW Universal Alkaline Phosphatase Red Detection Kit (Ventana Medical Systems, Inc., p/n 760-501), the silver wash (Ventana Medical Systems, Inc., p/n 780-002), and/or the INFORM Chromosome 17 Probe (Ventana Medical Systems, Inc., p/n 780-4331). Another cocktail assay is the INFORM HER2 Dual ISH DNA Probe sold by (Ventana Medical Systems, Inc.), which includes the INFORM HER2 Dual ISH DNA Probe Cocktail (Ventana Medical Systems, Inc., p/n 800-4422), the HybReady (Ventana Medical Systems, Inc., p/n 780-4409), the ultraView SISH DNP Detection Kit (Ventana Medical Systems, Inc., p/n 800-098), the ultraView Red ISH DIG Detection Kit (Ventana Medical Systems, Inc., p/n 800-505), the ultraView Siler Wash II (Ventana Medical Systems, Inc., p/n 780-003), and/or the HER2 Dual ISH 3-in-1 Xenograft Slides (Ventana Medical Systems, Inc., p/n 783-4332). Other cocktail assays can be used. Cocktail assays can be used to quantitatively detect amplification of the HER2 gene via two color chromogenic ISH in formalin-fixed, paraffin-embedded tissue specimens of human breast cancer and gastric cancer, including the gastro-oesophagal junction and can be an aid in the assessment of patients for whom Herceptin (trastuzumab) may be a treatment option. In yet other protocols, the cocktail assay is the VENTANA HER2 DNA Probe Assay sold by Ventana Medical Systems, Inc., p/n 800-4422. U.S. patent application Ser. No. 11/809,024 (corresponding to U.S. Patent Publication No. 2008/299555) entitled MULTICOLOR CHROMOGENIC DETECTION OF BIOMAKERS and U.S. patent application Ser. No. 11/809,024 (corresponding to U.S. Patent Publication No. 2011/0136130) entitled METHOD FOR CHROMOGENIC DETECTION OF TWO OR MORE TARGET MOLECULES IN A SINGLE SAMPLE disclose substances, protocols, and specimen processing techniques and are incorporated by reference in their entireties.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application Publication No. 2014/0178169, filed on Sep. 9, 2011, entitled IMAGING SYSTEMS, CASSETTES, AND METHODS OF USING THE SAME. International Patent Application No. PCT/US2010/002772 and U.S. Patent Application Publication No. 2014/0178169 are incorporated by reference in their entities. In other embodiments, the imaging apparatus includes a digital camera coupled to a microscope.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Methods of unmixing are well known to those of ordinary skill in the art and any method now known or later discovered may be used to "unmix" multiplex images into the vessel channel images. In general, the unmixing process extracts stain-specific channels to determine local concentrations of individual stains using reference spectra that are well known for standard types of tissue and stain combinations. For example, each pixel in an input image may comprise a mixture of component spectra including one or more quantum dots representing target structures, in addition to broadband signals such as DAPI and autofluorescence, as described above. The unmixing may use reference spectra retrieved from a control image or estimated from the image under observation. Unmixing the component signals of each input pixel enables retrieval and analysis of stain-specific channels, such as vessel channels and nuclei channels. The terms "unmixing" and "color deconvolution" (or "deconvolution") or the like (e.g. "deconvolving," "unmixed") are used interchangeably in the art.

In some embodiments, the multiplex images are unmixed using liner unmixing. Linear unmixing is described, for example, in 'Zimmermann "Spectral Imaging and Linear Unmixing in Light Microscopy" Adv Biochem Engin/Biotechnol (2005) 95:245-265' and in C. L. Lawson and R. J. Hanson, "Solving least squares Problems", PrenticeHall, 1974, Chapter 23, p. 161,' the disclosures of which are incorporated herein by reference in their entirety. In linear stain unmixing, the measured spectrum $(S(\lambda))$ at any pixel is considered a linear mixture of stain spectral components and equals the sum of the proportions or weights (A) of each individual fluorophore reference spectral signature $(R(\lambda))$ that is being expressed at the pixel $$S(\lambda) = A1 \cdot R1(\lambda) + A2 \cdot R2(\lambda) + A3 \cdot R3(\lambda) \ldots Ai \cdot Ri(\lambda)$$

which can be more generally expressed as in matrix form as $$S(\lambda) = \Sigma Ai \cdot Ri(k) \text{ or } S = R \cdot A$$

If there are M channels images acquired and N individual fluorophores, the columns of the M×N matrix R is the known reference spectral signature of the individual fluorophores and the N×1 vector A is the unknown of the proportions of individual fluorophores and the M×1 vector S is the measured multichannel spectral vector at a pixel. In these equations, the signal in each pixel (S) is measured during acquisition of the multiplex image and the reference spectra for the known stains are usually determined in an independent offline method from fluorescent specimens labeled with only a single stain using identical instrument settings. It becomes a simple linear algebra matrix exercise to determine the contributions of various stains (Ai) by calculating their contribution to each point in the measured spectrum. In some embodiments, the solution is obtained using an inverse least squares fitting approach that minimizes the square difference between the measured and calculated spectra by solving the following set of equations, $$[\partial \Sigma j \{S(\lambda j) - \Sigma i Ai \cdot Ri(\lambda j)\}2]/\partial Ai = 0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

Example 1

In dual ISH for HER2 detection as described in detail herein, if we have 20 cells for the given FOV(s), and the cell score is "Bi" (number of black dots picked for the i-th cell) and "Ri" (number of red dots picked for the i-th cell), then for the i-th cell, the final score for that slide is computed as:

Score=$(\Sigma Bi)/(\Sigma Ri)$, where the score is computed for all i where both Bi and Ri are >0.

The score is grouped into 3 bins:
i) Bin 1: score<=1.8
ii) Bin 2: score>1.8 and score<=2.2
iii) Bin 3: score>2.2

A prior art dot detection and classification method (V1) and the presently disclosed dot detection and classification method (V2) were both compared against ground truth values (GT) using 386 slides scanned on a HT Scanner (model number B113N7131) using software version number 1.0.2.2.

Table 1 provides a 3×3 confusion matrix comparing ground truth values against the prior art method (V1). The number of false negatives is shown for each bin.

TABLE 1

3 × 3 confusion matrix comparing ground truth data to prior art method of dot detection and classification.

| Each row: GT Each col: Prior art Method (V1) | Bin 1: V1 | Bin 2: V1 | Bin 3: V1 |
|---|---|---|---|
| Bin 1: GT | 135 | 11 | 16 (false positives) |
| Bin 2: GT | 22 | 4 | 8 |
| Bin 3: GT | 36 (false negatives) | 13 | 141 |

Table 2 provides a 3×3 confusion matrix comparing ground truth values against the dot detection and classification method disclosed herein (V2). The same slides and ground truth data were used between Table 1 and Table 2. The number of false negatives is again shown for each bin.

TABLE 2

3 × 3 confusion matrix comparing ground truth data to the presently disclosed method of dot detection and classification.

| Each row: GT Each col: algorithm v2 | Bin 1: v2 | Bin 2: v2 | Bin 3: v2 |
|---|---|---|---|
| Bin 1: GT | 153 | 8 | 1 (1 false positive as compared to 16 for v1) |
| Bin 2: GT | 11 | 16 | 7 |
| Bin 3: GT | 0 (no false negatives as compared to 36 for v1) | 20 | 170 |

Comparatively, the method of the present disclosure (V2) provides far superior results than those of the prior art (V1). Indeed, the number of false negatives in Bin 1 and Bin 2 were significantly reduced when comparing the present method to the prior art, and both against ground truth data. This is, in part, believed to be due to the superior dot detection which evaluated features based on absorbance, radial symmetry, DoG, A channel, and red and black unmixed channels; whereas the prior art method (V1) merely evaluated DoG features. Thus, dot pixel computation was superior in the present disclosure as compared with the prior art method and better data was able to be passed to the classifier for dot color classification. Therefore, the present disclosure discloses a dot detection, classification, and counting methodology that provides superior results than those of the prior art.

Additional Embodiments

1. An image processing method for detecting first (806) and second (808) dots representing in-situ hybridization signals of different color, the method being implemented in an image analysis system, the first and second dots being contained in a digital image of a tissue sample, the pixel intensity values of the first dots indicating in situ hybridization signals generated by a first stain having a first color, the pixel intensity values of the second dots indicating in situ hybridization signals generated by a second stain having a second color, the detection of the first and second dots in the digital image comprising: generating a first color channel image and a second color channel image via color deconvolution of the digital image, the first color channel image corresponding to the color spectrum contribution of the first stain and the second color channel image corresponding to the color spectrum contribution of the second stain; computing at least one DoG image from the digital image by applying a pair of Gaussian filters whose Kernels have a different standard deviation to the digital image and by subtracting the two filtered images output by the Gaussian filters from each other, the DoG image being a difference-of-Gaussian image; computing an absorbance image from the image of the tissue sample; detecting sets of adjacent pixels in the digital image whose absorbance values in the absorbance image exceed an absorbance threshold and whose DoG values in the DoG image exceeds an DoG threshold and using the detected sets of adjacent pixels as prospective dots; identifying the ones of the prospective dots whose intensity values in the first color channel image exceeds a first-color-intensity threshold and outputting said identified prospective dots as the detected first dots; and identifying the ones of the prospective dots whose intensity values in the second color channel image exceeds a second-color-intensity threshold and outputting said identified prospective dots as the detected second dots.

2. The image analysis method of embodiment 1, further comprising: calculating a ratio of first dots and second dots; and outputting the ratio via a user interface.

3. The image analysis method of any one of the previous embodiments, wherein the image of the tissue sample is an RGB image or wherein the method comprises a step of computing an RGB image from the image depicting the tissue sample, and wherein the absorbance image is generated by representing the R, G and B components of each pixel in the RGB image as ROD, GOD and BOD components of said pixel according to the formulas: $ROD=-\log(R/BK)$; $GOD=\log(G/BK)$; $BOD=-\log(B/BK)$, where BK is an assumed background intensity, and computing for each of the pixels in the absorbance image an absorbance value OD according to $OD=\text{sqrt}(ROD*ROD+GOD*GOD+BOD*BOD)$.

4. The image analysis method of any one of the previous embodiments, wherein the first stain is an in situ hybridization stain that selectively binds to HER2 genes, wherein the second stain is an in situ hybridization stain that selectively binds to the centromer of chromosome 17.

5. The image analysis method of any one of the previous embodiments, further comprising identifying an area in the digital image that corresponds to a cell in the tissue sample and identifying the first and second dots in each of the cells.

6. The image analysis method of embodiment 5, further comprising: computing the DoG threshold as a cell-specific DoG threshold DoG_thresholdCell according to DoG_thresholdCell=min(fraction_used*DoGmaxCell, DoG_thresholdGlobal) wherein DoGmaxCell is the maximum DoG value observed in the DoG image area covered by the identified cell; wherein the fraction_used is a predefined value between 0 and 1, preferentially between 0.2 and 0.3; and wherein DoG_thresholdGlobal indicates a global threshold that sets an upper bond to the threshold the DoG_thresholdCell, the DoG_thresholdGlobal having been obtained empirically by analyzing DoG values of a plurality of dots having been correctly identified in one or more training images.

7. The image analysis method of embodiment 6, further comprising: computing a plurality of different fraction values, each fraction value being a value larger than 0 and smaller than 1; computing for each of the fraction values fractioncand a respective candidate DoG threshold DoG_thresholdCellCand according to DoG_threshold-CellCand=min(fractioncand*DoGmaxCell, DoG_thresholdGlobal); identifying the minimum fraction value for which a maximum number of DoG peaks above a predefined DoG peak threshold are obtained for the cell; and using the identified fraction value as the fraction used value that is used for computing the DoG threshold used for identifying the dots in the cell.

8. The image analysis method of any one of the previous embodiments 5-7, further comprising: computing the absorbance threshold as a cell-specific absorbance threshold OD_thresholdCell according to OD_thresholdCell=max(OD_values(round(fractionOD*|OD_values|)), fractionOD*max(OD))), wherein OD_values is the sorted list of absorbance values in the cell, |OD_values| refers to the number of elements in the sorted list OD_values, and max(OD) is the maximum of the absorbance image values observed in the absorbance image in the area covered by the identified cell; wherein the fractionOD_used is a predefined value between 0 and 1, preferentially between 0.2 and 0.3.

9. The image analysis method of any one of embodiments 5-8, further comprising: computing the first-color-intensity threshold TB as a cell-specific first-color-intensity threshold according to TB=min(B_fraction*max(BL intensity values), (BL_values (round(cb*|BL|))), wherein B_fraction is a predefined value between 0 and 1, wherein cb is a predefined value between 0 and 1; wherein BL intensity values is the totality of intensity values in the first color channel image covered by the cell area, wherein BL is a sorted list of the BL intensity values in the cell, wherein |BL| refers to the number of elements in the sorted list UB, and max(BL intensity values) is the maximum of the intensity values observed in the first channel image in the area covered by the identified cell.

10. The image analysis method of any one of embodiments 5-9, further comprising: computing the second-color-intensity threshold TR as a cell-specific second-color-intensity threshold according to TR=R_fraction*max(RL intensity values), wherein R_fraction is a predefined value between 0 and 1, wherein RL intensity values is the totality of intensity values in the second color channel image covered by the cell area.

11. The image analysis method of any one of the previous embodiments, the generation of the first and second color channel images comprising: analyzing a plurality of first training dots in one or more training images (804), the pixel intensity values of the first training dots correctly and selectively indicating in situ hybridization signals generated by the first stain, thereby extracting at least one first reference color vector (814, 816) representing the optical signal spectrum provided by the first stain; analyzing a plurality of second training dots in the one or more training images, the pixel intensity values of the second training dots correctly and selectively indicating in situ hybridization signals generated by the second stain, thereby extracting at least one second reference color vector (810, 812) representing the optical signal spectrum provided by the second stain; using the at least one first and second reference color vectors for determining the color spectrum contribution of the first and second stain when performing the color deconvolution.

12. The image analysis method of embodiment 11, the generation of the first and second reference color vectors comprising: identifying a first tuple of R, G B values being typical for the first dots by computing the mean or average R, G and B values of all pixels contained in the first training dots; using the first tuple of R, G and B values as the at least one first reference color vector; identifying a second tuple of R, G B values being typical for the second dots by computing the mean or average R, G and B values of all pixels contained in the second training dots; and using the second tuple of R, G and B values as the at least one second reference color vector.

13. The image analysis method of embodiment 11 or 12, the at least one first reference color vector being a plurality of first reference color vectors, the at least one second reference color vector being a plurality of second reference color vectors, the method comprising: defining a number of absorbance bins, the absorbance bins being non-overlapping, numerical ranges comprising only non-negative numbers; for each of the first training dots, computing a first reference absorbance value OD1 by transforming the first tuple of R, G and B values into ROD1, GOD1 and BOD1 values being typical for a first dot according to the formulas: ROD1=−log(R/BK); GOD1=log(G/BK); BOD1=−log(B/BK) and according to OD1=sqrt(ROD1*ROD1+GOD1*GOD1+BOD1*BOD1), where BK is a background intensity; for each of the second training dots, computing a second reference absorbance value OD2 by transforming the second tuple of R, G and B values into ROD2, GOD2 and BOD2 values being typical for a second dot according to the formulas: ROD2=−log(R/BK); GOD2=log(G/BK); BOD2=−log(B/BK) and OD2=sqrt(ROD2*ROD2+GOD2*GOD2+BOD2*BOD2), where BK is a background intensity; grouping all first training dots into different first groups according to their respective first reference absorbance values OD1, wherein all first training dots whose first reference absorbance value are contained in the same absorbance bin are grouped into the same first group; grouping all second training dots into different second groups according to their respective second reference absorbance values OD2, wherein all second training dots whose second reference absorbance value are contained in the same absorbance bin are grouped into the same second group; for each of the first groups, computing a bin-specific first reference color vector by computing the mean or average R, G and B values of all pixels contained in the first training dots having been grouped into said first group; using the bin-specific first reference color vectors as the plurality of first reference color vectors; for each of the second groups, computing a bin-specific second reference color vector by computing the mean or average R, G and B values of all pixels contained in the second training dots having been grouped into said second group; and using the bin-specific second reference color vectors as the plurality of second reference color vectors.

14. The image analysis method of embodiment 12, wherein a first set of absorbance bins is used for grouping the first training dots and wherein a second set of absorbance bins is used for grouping the second training dots, the first and second sets of absorbance bins having bins of different absorbance ranges, and wherein for each bin in the first set of bins a respective first reference color vector is computed and wherein for each bin in the second set of bins a respective second reference color vector is computed.

15. The image analysis method of embodiment 13 or 14, wherein the absorbance bins for the first groups are determined by analyzing a first histogram of the occurrence frequencies of first reference absorbance values OD1 of all first training dots and selecting the bins such that each bin approximately comprises the same number of first training dots; and/or wherein the absorbance bins for the second groups are determined by analyzing a second histogram of the occurrence frequencies of second reference absorbance values OD2 of all second training dots and selecting the bins such that each bin approximately comprises the same number of second training dots.

16. The image analysis method of any one of the previous embodiments 11-15, further comprising: upon performing the color deconvolution, identifying an absorbance value in a sub-region of the absorbance image corresponding to a sub-region of the digital image that is currently processed by the color deconvolution; identifying at least one absorbance bin comprising said identified absorbance value; identifying the first and second reference color vectors having been computed for the at least one identified absorbance bin; and using the identified first and second reference color vectors for determining the color spectrum contribution of the first and second stain when performing the color deconvolution for said image sub-region.

17. The image analysis method of any one of the preceding embodiments, the computation of the at least one DoG image from the digital image comprises computing a plurality of DoG images from the digital image by: computing a first DoG image from the digital image by applying a first pair of Gaussian filters whose Kernels have a different standard deviations to the digital image and by subtracting the two filtered images output by the first pair of Gaussian filters from each other; computing at least a second DoG image from the digital image by applying a second pair of Gaussian filters whose Kernels have a different standard deviations to the digital image, the second pair of Gaussian filters differing from the first pair of Gaussian filters, and by subtracting the two filtered images output by the second pair of Gaussian filters from each other; the detecting of the sets of adjacent pixels in the digital image comprising detecting the sets of adjacent pixels in the digital image whose absorbance values in the absorbance image exceed an absorbance threshold and whose DoG values in the DoG image exceeds an DoG threshold in at least one of the plurality of DoG images and using the detected sets of adjacent pixels as prospective dots.

18. The image analysis method of any one of the previous embodiments, further comprising refining the sets of adjacent pixels used as the prospective by removing one or more of the prospective dots and/or by adding additional adjacent pixel areas to the identified prospective dots.

19. The image analysis method of embodiment 18, further comprising: computing a gradient magnitude image from the absorbance image, the gradient magnitude image comprising, at each of its pixels, a gradient magnitude value indicating the amount of a change in the absorbance value in the absorbance image in respect to one or more neighbor pixels; identifying sets of adjacent pixels whose gradient magnitude in the gradient magnitude image exceeds a gradient magnitude threshold; and in case one of said identified sets of adjacent pixels has not already been used as prospective dot, adding said identified set of adjacent pixels to the identified prospective dots.

20. The image analysis method of embodiment 18 or 19, wherein the refinement removes third dots wrongly detected as first dots by performing a 2-class k means clustering of all dots having initially been detected as first dots, the 2-class k-means clustering taking an average or median absorbance value of each of said first dots and a radial symmetry vote strength of each of said first dots as input, the absorbance value being derived from corresponding pixels in the absorbance image, the radial symmetry vote strength being a data value assigned to the center pixel of a dot and being indicative of the radial symmetry of said dot.

21. The image analysis method of embodiment 20, the radial symmetry vote strength being computed by: computing a gradient image from the absorbance image, the gradient image comprising, at each of its pixels, a direction and a gradient magnitude value, the gradient magnitude value indicating the amount of a change in the absorbance value in the absorbance image in respect to one or more neighbor pixels and a direction, the direction indicating the change in absorbance across the neighbor pixels; performing a voting operation whereby each of the pixels casts a vote along the gradient direction to one or more neighbor pixels; computing, at least for the pixels located at the center of the first dots, an aggregated vote strength, the aggregated vote strength aggregating the votes cast by the neighbor pixels on said pixels at the dot center, the aggregated vote strength being indicative of the degree of radial symmetry of the first dot.

22. The image analysis method of any one of embodiments 18-21, wherein the refinement discards fringing first color pixels from second dot blobs and discards fringing second color pixels from first dot blobs by applying dot-shape-related heuristics to the digital image of the tissue sample.

23. The image analysis method of any one of embodiments 18-22, wherein the refinement assigns first color pixels fringing a second dot to said second dot and assigns second color pixels fringing a first dot to said first dot, the method further comprising re-execution of the identification of the first and second dots, whereby the fringing pixels assigned during the refinement remain assigned to the respective first and second dots.

24. The image analysis method of any one of the previous embodiments 2-23, the first dots corresponding to hybridization signals of the first stain selectively binding to a first sequence, the second dots corresponding to optical signals of the second stain, the second stain selectively binding to a second DNA sequence located on the same chromosome as the first DNA sequence or selectively binding to a centromer of said chromosome, the ratio being determined for determining if an amplification of the first DNA sequence is caused by an amplification of the chromosome comprising the first DNA sequence.

25. An image analysis device comprising one or more processors and at least one memory, the at least one memory storing non-transitory computer-readable instructions for execution by the one or more processors to cause the one or more processors to execute the method according to any one of the previous embodiments.

26. A non-volatile computer readable storage medium comprising non-transitory computer-readable instructions for execution by one or more processors to cause the one or more processors to execute the method according to any one of the previous embodiments 1-24.

27. A computing device configured to detect an expression level of a gene in a tissue sample comprising one or more processors and at least one memory, the at least one memory storing non-transitory computer-readable instructions for execution by the one or more processors to cause the one or more processors to execute instructions to: detect dots in an image of the tissue sample that meet criteria for absorbance strength, black unmixed image channel strength, red unmixed image channel strength, and a difference of Gaussian threshold, wherein the detected dots correspond to in situ hybridization signals in the tissue samples; classify the detected dots as belonging to a black in situ hybridization signal corresponding to HER2 or to a red in situ hybridization signal corresponding to Chromosome 17; and calculate a ratio of those classified dots belonging to the black in situ hybridization and those belonging to the red in situ hybridization signal.

28. The computing device of embodiment 27, wherein the dots that meet criteria for the absorbance strength, the black unmixed image channel strength, the red unmixed image channel strength, and the difference of Gaussian threshold are detected by computing a union of dot pixels and black/red pixels meeting predefined threshold criteria.

29. The computing device of embodiment 27, wherein the dot pixels are determined by identifying pixels in the image of the tissue sample that meet both absorbance thresholds and DoG thresholds.

30. The computing device of embodiment 29, wherein the pixels that meet the absorbance threshold are identified by deriving an absorbance image from the image of the tissue sample and evaluating whether pixels in the absorbance image meet the absorbance threshold; and wherein the pixels that meet the DoG threshold are identified by deriving a DoG image from the image of the tissue sample and evaluating whether pixels in the DoG image meet the DoG threshold.

31. The computing device of embodiment 27, wherein the black/red pixels are determined by independently identifying (i) prospective black pixels meeting absorbance thresholds, and (ii) prospective red pixels meeting absorbance thresholds.

32. The computing device of embodiment 31, wherein the prospective black pixels are determined by identifying black pixels in the image of the tissue sample that meet both a black unmixed channel image threshold and a DoG threshold.

33. The computing device of embodiment 32, wherein the black pixels that meet the black unmixed image channel image threshold are identified by deriving a black unmixed channel image from the image of the tissue sample and evaluating whether pixels in the black unmixed channel image meet the black unmixed channel image threshold; and wherein black pixels that meet the DoG threshold are identified by deriving a DoG image from the image of the tissue sample and evaluating whether black pixels in the DoG image meet the DoG threshold.

34. The computing device of embodiment 31, wherein the prospective red pixels are determined by identifying red pixels in the image of the tissue sample that meet both a red unmixed channel image threshold and a DoG threshold.

35. The computing device of embodiment 34, wherein the red pixels that meet the red unmixed image channel image threshold are identified by deriving a red unmixed channel image from the image of the tissue sample and evaluating whether pixels in the red unmixed channel image meet the red unmixed channel image threshold; and wherein red pixels that meet the DoG threshold are identified by deriving a DoG image from the image of the tissue sample and evaluating whether red pixels in the DoG image meet the DoG threshold.

36. The computing device of embodiment 28, wherein the detection of the dots further comprises providing instructions to perform morphological operations on a prospective set of dot pixels.

37. The computer device of embodiment 27, wherein instructions are provided to refine the dot detection and classification.

38. The computer device of embodiment 37, wherein the dot detection and classification are refined by providing instructions to remove blue dots wrongly classified as black by performing a 2-class k means clustering based on absorbance and radial symmetry vote strength.

39. The computer device of embodiment 37, wherein the dot detection and classification are refined by providing instructions to discard fringing red dot blobs and fringing black dot blobs by applying shape based heuristics to the image of the tissue sample.

40. The computer device of embodiment 37, wherein the dot detection and classification are refined by restoring missed black and red dots by providing instructions (1) to identify local maxima using radial symmetry voting on a gradient magnitude image computed on an absorbance image to identify black dots centers; and (2) identify local maxima using radial symmetry voting on a gradient magnitude image computed on an A channel image in the LAB domain to identify red dot centers.

41. The computer device of embodiment 27, the ratio is calculated based on a count of red dot blobs and black dot blobs, wherein the red dot blobs are identified by connected components labeling of all classified dots belonging to the red in situ hybridization signal and wherein the black dot blobs are identified by connected components labeling of all classified dots belonging to the black in situ hybridization signal.

42. The computer device of embodiment 27, wherein instructions are provided to determine an expression level of a gene by evaluating the calculated ratio.

43. A computer-implemented method of detecting, classifying, and counting dots in an image of a tissue specimen comprising detecting dots in an image of the tissue sample that meet criteria for absorbance strength, black unmixed image channel strength, red unmixed image channel strength, and a difference of Gaussian threshold, wherein the detected dots correspond to in situ hybridization signals in the tissue samples; classifying the detected dots as belonging to a black in situ hybridization signal corresponding to HER2 or to a red in situ hybridization signal corresponding to Chromosome 17; and calculating a ratio of those dots belonging to the black in situ hybridization signal and those belonging to the red in situ hybridization signal.

44. The computer-implemented method of embodiment 43, wherein the dots that meet criteria for the absorbance strength, the black unmixed image channel strength, the red unmixed image channel strength, and the difference of Gaussian threshold are detected by computing a union of dot pixels black/red pixels meeting predefined threshold criteria.

45. The computer-implemented method of embodiment 44, wherein the dot pixels are determined by identifying pixels in the image of the tissue sample that meet both absorbance thresholds and DoG thresholds.

46. The computer-implemented method of embodiment 45, wherein the pixels that meet the absorbance threshold are identified by deriving an absorbance image from the image of the tissue sample and evaluating whether pixels in the absorbance image meet the absorbance threshold; and wherein the pixels that meet the DoG threshold are identified by deriving a DoG image from the image of the tissue sample and evaluating whether pixels in the DoG image meet the DoG threshold.

47. The computer-implemented method of embodiment 44, wherein the black/red pixels are determined by independently identifying (i) prospective black pixels meeting absorbance thresholds, and (ii) prospective red pixels meeting absorbance thresholds.

48. The computer-implemented method of embodiment 47, wherein the prospective black pixels are determined by identifying black pixels in the image of the tissue sample that meet both a black unmixed channel image threshold and a DoG threshold.

49. The computer-implemented method of embodiment 48, wherein the black pixels that meet the black unmixed image channel image threshold are identified by deriving a black unmixed channel image from the image of the tissue sample and evaluating whether pixels in the black unmixed channel image meet the black unmixed channel image threshold; and wherein black pixels that meet the DoG threshold are identified by deriving a DoG image from the image of the tissue sample and evaluating whether black pixels in the DoG image meet the DoG threshold.

50. The computer-implemented method of embodiment 47, wherein the prospective red pixels are determined by identifying red pixels in the image of the tissue sample that meet both a red unmixed channel image threshold and a DoG threshold.

51. The computer-implemented method of embodiment 50, wherein the red pixels that meet the red unmixed image channel image threshold are identified by deriving a red unmixed channel image from the image of the tissue sample and evaluating whether pixels in the red unmixed channel image meet the red unmixed channel image threshold; and wherein red pixels that meet the DoG threshold are identified by deriving a DoG image from the image of the tissue sample and evaluating whether red pixels in the DoG image meet the DoG threshold.

52. The computer-implemented method of embodiment 44, wherein the detection of dots further comprises performing morphological operations on a prospective set of dot pixels.

53. The computer-implemented method of embodiment 43, further comprising refining the dot detection and classification.

54. The computer-implemented method of embodiment 53, wherein the refinement removes blue dots wrongly classified as black by performing a 2-class k means clustering based on absorbance and radial symmetry vote strength.

55. The computer-implemented method of embodiment 53, wherein the refinement discards fringing red dot blobs and fringing black dot blobs by applying shape based heuristics to the image of the tissue sample.

56. The computer-implemented method of embodiment 53, wherein the refinement restores missed black dots and missed red dots by providing instructions (1) to identify local maxima using radial symmetry voting on a gradient magnitude image computed on an absorbance image to identify black dots centers; and (2) identify local maxima using radial symmetry voting on a gradient magnitude image computed on an A channel image in the LAB domain to identify red dot centers.

57. The computer-implemented method of embodiment 43, the ratio is calculated based on a count of red dot blobs and black dot blobs, wherein the red dot blobs are identified by connected components labeling of all classified dots belonging to the red in situ hybridization signal and wherein the black dot blobs are identified by connected components labeling of all classified dots belonging to the black in situ hybridization signal.

58. The computer-implemented method of embodiment 27, further comprising determining an expression level of a gene by evaluating the calculated ratio.

59. A method for automated evaluation of a level of gene expression: (a) applying in situ hybridization probes to a tissue specimen, the in situ hybridization probes providing black and red signals; (b) subsequently obtaining one or more digital images of the tissue specimen; (c) selecting a field of view in the digital image; (d) within the field of view, computing a foreground segmentation mask to identify individual nuclei; (e) from the identified individual nuclei, determining those nuclei suitable for scoring; (f) detecting dots in the nuclei suitable for scoring that meet criteria for absorbance strength, black unmixed image channel strength, red unmixed image channel strength, and a difference of Gaussian threshold, wherein the detected dots correspond to the red and black in situ hybridization signals; (g) classifying the detected dots as belonging to a black in situ hybridization signal corresponding to HER2 or to a red in situ hybridization signal corresponding to Chromosome 17; and (h) calculating a ratio of those classified dots belonging to the black in situ hybridization signal and those belonging to the red in situ hybridization signal.

60. The method of embodiment 59, further comprising determining an expression level of a gene by evaluating the calculated ratio.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The invention claimed is:

1. A system for detecting first and second dots representing in situ hybridization signals having different colors, the first and second dots being contained in a digital image of a tissue sample, the pixel intensity values of the first dots indicating in situ hybridization signals generated by a first stain having a first color, the pixel intensity values of the second dots indicating in situ hybridization signals generated by a second stain having a second color, the system comprising: (i) one or more processors, and (ii) a memory coupled to the one or more processors, the memory to store computer-executable instructions that, when executed by the one or more processors, cause the one or more processors to perform operations comprising:
 generating a first color channel image and a second color channel image via color deconvolution of the digital image, the first color channel image corresponding to a color spectrum contribution of the first stain and the second color channel image corresponding to a color spectrum contribution of the second stain;
 computing at least one difference of Gaussian (DoG) image from the digital image by applying a pair of Gaussian filters whose Kernels have a different standard deviation to the digital image and by subtracting the two filtered images output by the Gaussian filters from each other;

computing an absorbance image from the digital image of the tissue sample;

detecting sets of adjacent pixels in the digital image whose absorbance values in the absorbance image exceed an absorbance threshold and whose DoG values in the at least one DoG image exceeds a DoG threshold, and using the detected sets of adjacent pixels as prospective dots;

identifying first prospective dots whose intensity values in the first color channel image exceeds a first-color-intensity threshold and outputting said identified first prospective dots as detected first dots; and identifying second prospective dots whose intensity values in the second color channel image exceeds a second-color-intensity threshold and outputting said second identified prospective dots as detected second dots.

2. The system of claim 1, further comprising:
calculating a ratio of first dots and second dots; and
outputting the ratio via a user interface.

3. The system of claim 1, further comprising identifying an area in the digital image that corresponds to a cell in the tissue sample and identifying the first and second dots in each of the cells.

4. The system of claim 1, further comprising refining the sets of adjacent pixels used as the prospective dots by removing one or more of the prospective dots or by adding additional adjacent pixel areas to the identified prospective dots.

5. A non-transitory computer-readable medium for storing computer-executable instructions that are executed by a processor to perform operations comprising:
detecting dots in an image of a tissue sample that meet criteria for absorbance strength, black unmixed image channel strength, red unmixed image channel strength, and a difference of Gaussian (DoG) threshold, wherein the detected dots correspond to in situ hybridization signals in the tissue sample, and wherein the detected dots that meet criteria for the absorbance strength, the black unmixed image channel strength, the red unmixed image channel strength, and the difference of Gaussian threshold are detected by computing a union of dot pixels and black or red pixels meeting predefined threshold criteria;
classifying the detected dots as belonging to a black in situ hybridization signal corresponding to HER2 or to a red in situ hybridization signal corresponding to Chromosome 17; and calculating a ratio of those classified dots belonging to the black in situ hybridization signal and those belonging to the red in situ hybridization signal.

6. The non-transitory computer-readable medium of claim 5, wherein the dot pixels are determined by identifying pixels in the image of the tissue sample that meet both absorbance thresholds and the DoG threshold; wherein pixels that meet the absorbance thresholds are identified by deriving an absorbance image from the image of the tissue sample and evaluating whether pixels in the absorbance image meet the absorbance thresholds; and wherein pixels that meet the DoG threshold are identified by deriving a DoG image from the image of the tissue sample and evaluating whether pixels in the DoG image meet the DoG threshold.

7. The non-transitory computer-readable medium of claim 5, wherein the black or red pixels are determined by independently identifying (i) prospective black pixels meeting absorbance thresholds, and (ii) prospective red pixels meeting absorbance thresholds.

8. The non-transitory computer-readable medium of claim 7, wherein the prospective black pixels are determined by identifying black pixels in the image of the tissue sample that meet both a black unmixed channel image threshold and the DoG threshold, wherein black pixels that meet the black unmixed image channel image threshold are identified by deriving a black unmixed channel image from the image of the tissue sample and evaluating whether pixels in the black unmixed channel image meet the black unmixed channel image threshold; and wherein black pixels that meet the DoG threshold are identified by deriving a DoG image from the image of the tissue sample and evaluating whether black pixels in the DoG image meet the DoG threshold.

9. The non-transitory computer-readable medium of claim 7, wherein the prospective red pixels are determined by identifying red pixels in the image of the tissue sample that meet both a red unmixed channel image threshold and the DoG threshold, wherein red pixels that meet the red unmixed image channel image threshold are identified by deriving a red unmixed channel image from the image of the tissue sample and evaluating whether pixels in the red unmixed channel image meet the red unmixed channel image threshold; and wherein red pixels that meet the DoG threshold are identified by deriving a DoG image from the image of the tissue sample and evaluating whether red pixels in the DoG image meet the DoG threshold.

10. The non-transitory computer-readable medium of claim 5, wherein instructions are provided to refine the dot detection and classification.

11. The non-transitory computer-readable medium of claim 10, wherein the dot detection and classification are refined by providing instructions to remove blue dots wrongly classified as black by performing a 2-class k means clustering based on absorbance and radial symmetry vote strength.

12. The non-transitory computer-readable medium of claim 10, wherein the dot detection and classification are refined by providing instructions to discard fringing red dot blobs and fringing black dot blobs by applying shape based heuristics to the image of the tissue sample.

13. The non-transitory computer-readable medium of claim 10, wherein the dot detection and classification are refined by restoring missed black and red dots by providing instructions (1) to identify local maxima using radial symmetry voting on a gradient magnitude image computed on an absorbance image to identify black dot centers; and (2) identify local maxima using radial symmetry voting on a gradient magnitude image computed on an A channel image in the LAB domain to identify red dot centers.

14. A computer-implemented method of detecting, classifying, and counting dots in an image of a tissue specimen comprising:
detecting dots in an image of a tissue sample that meet criteria for absorbance strength, black unmixed image channel strength, red unmixed image channel strength, and a difference of Gaussian (DoG) threshold, wherein the detected dots correspond to in situ hybridization signals in the tissue sample;
classifying the detected dots as belonging to a black in situ hybridization signal corresponding to HER2 or to a red in situ hybridization signal corresponding to Chromosome 17; and calculating a ratio of those dots belonging to the black in situ hybridization signal and those belonging to the red in situ hybridization signal, wherein the ratio is calculated based on a count of red dot blobs and black dot blobs, wherein the red dot blobs are identified by connected components labeling of all classified dots belonging to the red in situ hybridization signal and wherein the black dot blobs are identified by connected components labeling of all classified dots belonging to the black in situ hybridization signal.

15. The computer-implemented method of claim 14, wherein the detected dots that meet criteria for the absorbance strength, the black unmixed image channel strength, the red unmixed image channel strength, and the difference of Gaussian threshold are detected by computing a union of dot pixels and black or red pixels meeting predefined threshold criteria, wherein the dot pixels are determined by identifying pixels in the image of the tissue sample that meet both absorbance thresholds and the DoG threshold.

16. The computer-implemented method of claim 15, wherein pixels that meet the absorbance thresholds are identified by deriving an absorbance image from the image of the tissue sample and evaluating whether pixels in the absorbance image meet the absorbance thresholds; and wherein pixels that meet the DoG threshold are identified by deriving a DoG image from the image of the tissue sample and evaluating whether pixels in the DoG image meet the DoG threshold.

17. The computer-implemented method of claim 15, wherein the black or red pixels are determined by independently identifying (i) prospective black pixels meeting absorbance thresholds, and (ii) prospective red pixels meeting absorbance thresholds.

18. The computer-implemented method of claim 17, wherein the prospective black pixels are determined by identifying black pixels in the image of the tissue sample that meet both a black unmixed channel image threshold and the DoG threshold, wherein black pixels that meet the black unmixed image channel image threshold are identified by deriving a black unmixed channel image from the image of the tissue sample and evaluating whether pixels in the black unmixed channel image meet the black unmixed channel image threshold; and wherein black pixels that meet the DoG threshold are identified by deriving a DoG image from the image.

19. The computer-implemented method of claim 17, wherein the prospective red pixels are determined by identifying red pixels in the image of the tissue sample that meet both a red unmixed channel image threshold and the DoG threshold, wherein red pixels that meet the red unmixed image channel image threshold are identified by deriving a red unmixed channel image from the image of the tissue sample and evaluating whether pixels in the red unmixed channel image meet the red unmixed channel image threshold; and wherein red pixels that meet the DoG threshold are identified by deriving a DoG image from the image of the tissue sample and evaluating whether red pixels in the DoG image meet the DoG threshold.

20. The computer-implemented method of claim 14, wherein the detection of dots further comprises performing morphological operations on a prospective set of dot pixels.

21. The computer-implemented method of claim 14, further comprising refining the dot detection and classification, wherein the refining comprises at least one of: (i) removing blue dots wrongly classified as black by performing a 2-class k means clustering based on absorbance and radial symmetry vote strength; (ii) discarding fringing red dot blobs and fringing black dot blobs by applying shape based heuristics to the image of the tissue sample; and (iii) restoring missed black dots and missed red dots by providing instructions (1) to identify local maxima using radial symmetry voting on a gradient magnitude image computed on an absorbance image to identify black dot centers; and (2) identify local maxima using radial symmetry voting on a gradient magnitude image computed on an A channel image in the LAB domain to identify red dot centers.

22. The computer-implemented method of claim 14, further comprising determining an expression level of a gene by evaluating the calculated ratio.

* * * * *